US006698010B1

(12) United States Patent
Yamanouchi et al.

(10) Patent No.: US 6,698,010 B1
(45) Date of Patent: Feb. 24, 2004

(54) SYSTEM, METHOD AND COMPUTER PROGRAM PRODUCT FOR AUTOMATIC GENERATION OF DATA PROCESSING PROGRAM

(75) Inventors: Toru Yamanouchi, Tokyo (JP); Akiyoshi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 454 days.

(21) Appl. No.: 09/640,693

(22) Filed: Aug. 18, 2000

(30) Foreign Application Priority Data

Aug. 20, 1999 (JP) .......................................... 11-233910

(51) Int. Cl.[7] ................................................ G06F 9/44
(52) U.S. Cl. ....................................... 717/106; 717/104
(58) Field of Search ................. 717/110–113, 104–109; 707/1.3, 100, 102–104

(56) References Cited

U.S. PATENT DOCUMENTS

| | | | | | |
|---|---|---|---|---|---|
| 5,353,401 | A | * | 10/1994 | Iizawa et al. | 345/763 |
| 5,499,371 | A | * | 3/1996 | Henninger et al. | 717/108 |
| 5,857,195 | A | * | 1/1999 | Hayashi et al. | 707/102 |
| 5,875,331 | A | * | 2/1999 | Lindsey | 717/108 |
| 5,987,247 | A | * | 11/1999 | Lau | 717/100 |
| 6,003,022 | A | * | 12/1999 | Eberhard et al. | 707/2 |
| 6,032,198 | A | * | 2/2000 | Fujii et al. | 709/328 |
| 6,182,274 | B1 | * | 1/2001 | Lau | 717/104 |
| 6,182,278 | B1 | * | 1/2001 | Hamada et al. | 717/107 |
| 6,351,842 | B2 | * | 2/2002 | Ahmavuo et al. | 717/107 |

FOREIGN PATENT DOCUMENTS

| | | |
|---|---|---|
| JP | 1-147621 | 6/1989 |
| JP | 3-90933 | 4/1991 |
| JP | 3-182932 | 8/1991 |
| JP | 10-232803 | 9/1998 |

OTHER PUBLICATIONS

Ornburn et al. Building, Modifying, and Using Component Generators. IEEE. 1993. pp. 391–402.*

* cited by examiner

*Primary Examiner*—Wei Zhen
(74) *Attorney, Agent, or Firm*—Foley & Lardner

(57) ABSTRACT

To generate automatically a data processing program for referring to, updating, and deleting the date of a table of a database, using a cursor definition statement. Specification input means accepts specifications. The specification input means outputs the specifications into next stages for acquiring program skeleton customize information, cursor definition information and output item processing information. On the basis of these information, three statements are made: a cursor definition statement, a work variable definition statement and an output processing statement depending on the specified processing type (insert, update, delete). An object program is generated by combining these statements, a program skeleton and program skeleton customize information. Concretely, the combining means inserts these statements into the respective corresponding inserting positions of the program skeleton, including the program of a fixed portion regardless of the content of specifications and an inserting position of a piece of the program corresponding to a portion changeable according to specifications, thereby completing the object program.

12 Claims, 38 Drawing Sheets

F I G. 2A
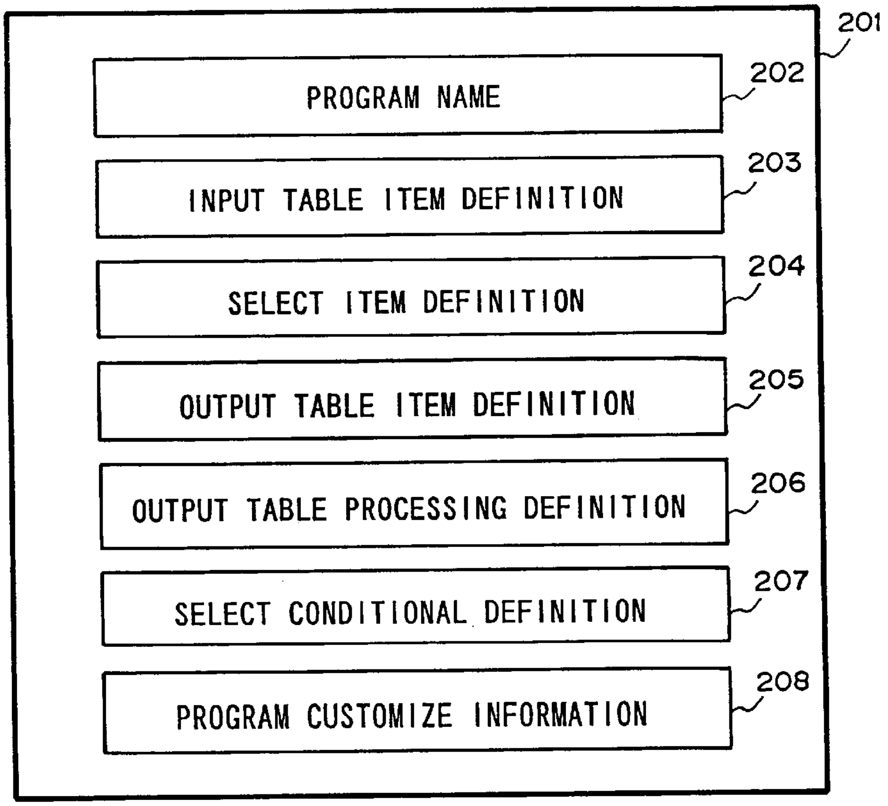
F I G. 2B
| PROCESSING TYPE | PROCESSING CONDITION | UPDATE/DELETE CONDITION | PROCESSING EXPRESSION |
| --- | --- | --- | --- |
| INSERT | OPTIONAL | UNNECESSARY | NECESSARY |
| UPDATE | OPTIONAL | NECESSARY | NECESSARY |
| DELETE | OPTIONAL | NECESSARY | UNNECESSARY |

```
insert into <<OUTPUT TABLE NAME>>(
 <<ITEM NAME LIST>>
 )values(
 <<VARIABLE NAME LIST>>
 );
```

```
update <<OUTPUT TABLE NAME>>
    set <<UPDATE STATEMENT LIST>>
    WHERE<<UPDATE CONDITION>>
```

```
delete from <<OUTPUT TABLE NAME>>
    WHERE<<DELETE CONDITION>>
```

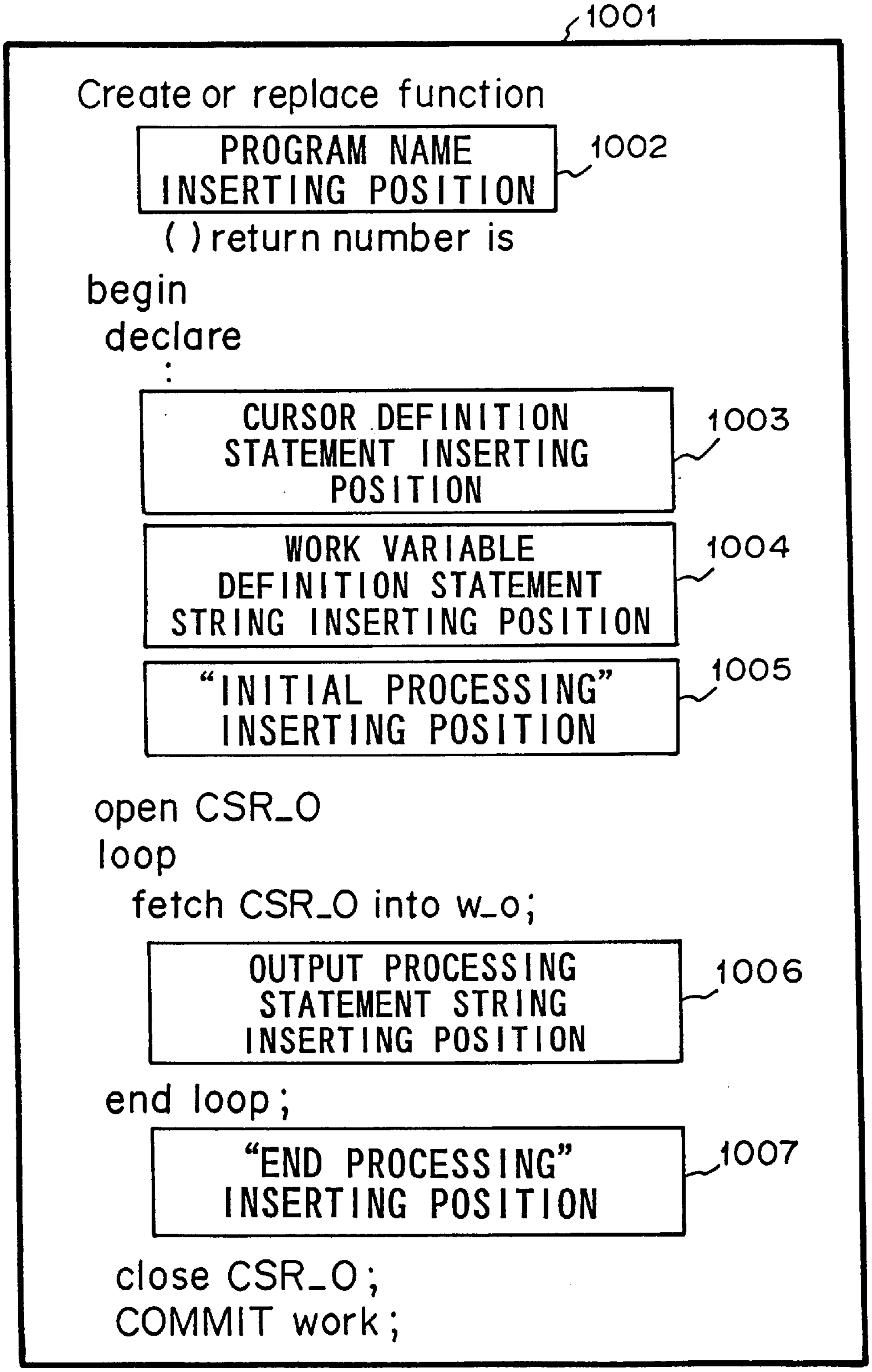

FIG. 10

```
Create or replace function
    [PROGRAM NAME INSERTING POSITION]  1002
    ( ) return number is
begin
  declare
    :
    [CURSOR DEFINITION STATEMENT INSERTING POSITION]  1003

    [WORK VARIABLE DEFINITION STATEMENT STRING INSERTING POSITION]  1004

    ["INITIAL PROCESSING" INSERTING POSITION]  1005

  open CSR_O
  loop
    fetch CSR_O into w_o;
    [OUTPUT PROCESSING STATEMENT STRING INSERTING POSITION]  1006
  end loop;
    ["END PROCESSING" INSERTING POSITION]  1007
  close CSR_O;
  COMMIT work;
```

| | | |
|---|---|---|
| PROGRAM NAME | SALES CALCULATION | 1901 |

| TABLE NAME | INPUT/OUTPUT DISCRIMINATION | ITEM NAME | TYPE | CALCULATION PROCESSING | |
|---|---|---|---|---|---|
| | | | | | 1902 |
| SALES VOLUME | INPUT | CODE | char (4) | | 1903 |
| | | SALES | number (6) | | 1904 |
| GOODS | INPUT | CODE | char (4) | | 1905 |
| | | NAME | char (13) | | 1906 |
| | | PRICE | number (8) | | 1907 |
| SALES LIST | OUTPUT | CODE | char (4) | | 1908 |
| | | NAME | char (13) | | 1909 |
| | | TOTAL | number (14) | | 1910 |

| | | |
|---|---|---|
| SELECT CONDITION | SALES VOLUME.SALES > 10 and<br>SALES VOLUME. CODE = GOODS. CODE | 1911 |
| INITIAL PROCESSING | Init_module; | 1912 |
| END PROCESSING | End_module; | 1913 |

F I G . 20
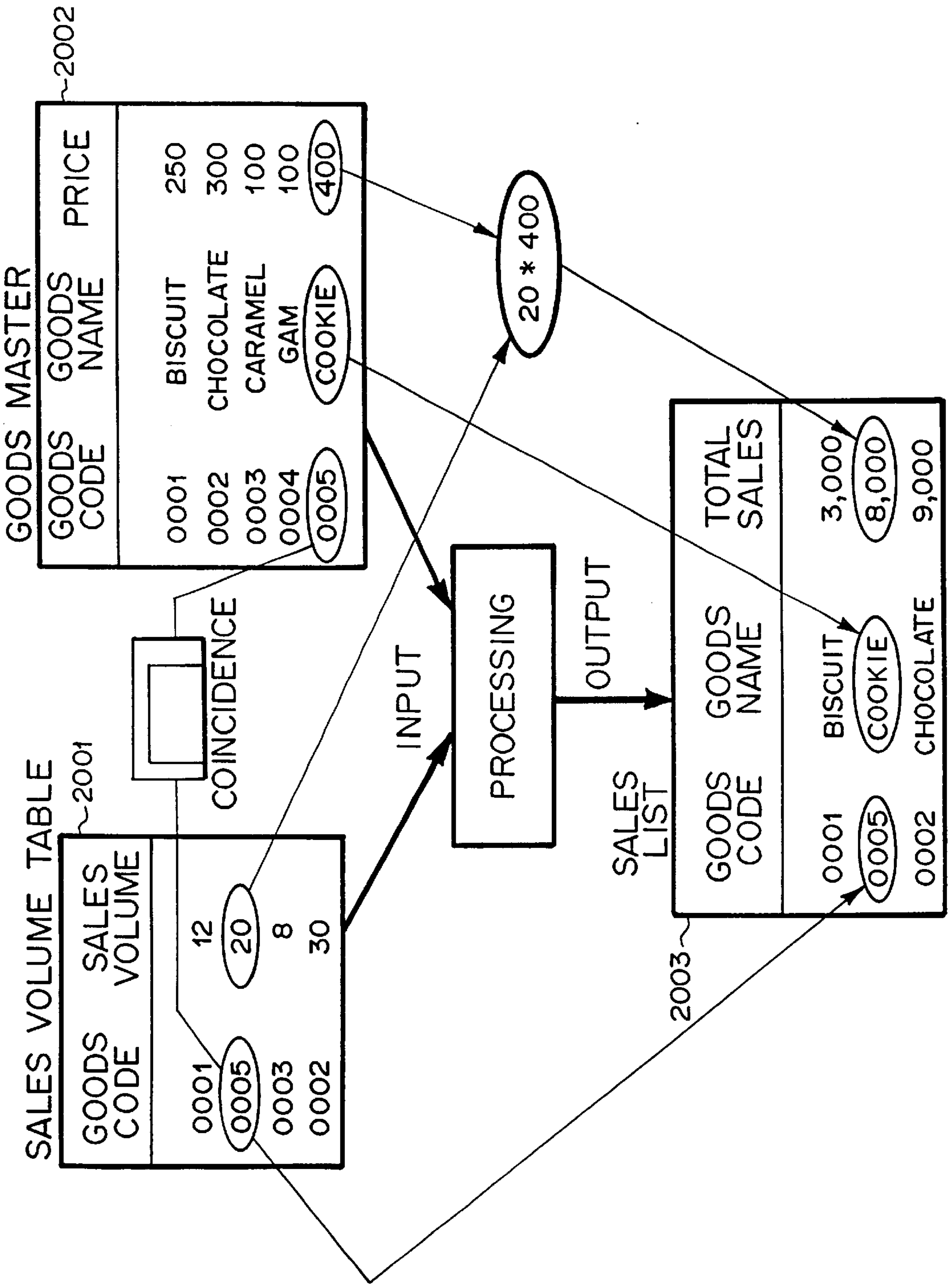

FIG. 21

2101: MAKE <<INTERNAL INFORMATION>> EMPTY
2102: GENERATE “PROGRAM NAME : <<PROGRAM NAME>>” AND ADD IT TO <<INTERNAL INFORMATION>>
2103: GENERATE “TABLE :[“ AND ADD IT TO <<INTERNAL INFORMATION>>
2104: OBTAIN INFORMATION RELATIVE TO EACH TABLE FROM THE SPECIFICATION, AND REPEAT THE FOLLOWING STEPS AS FOR EACH TABLE <<TABLE>>

2105: GENERATE “”(<<TABLE>>,<<INPUT/OUTPUT DISCRIMINATION>>, [", AND ADD IT TO <<INTERNAL INFORMATION>>
2106: IF <<INPUT/OUTPUT DISCRIMINATION>> IS INPUT?
2107: THEN REPEAT THE FOLLOWING STEPS AS FOR EACH ITEM <<ITEM>> WITHIN <<TABLE>>
2108: GENERATE “(<<ITEM>>, <<TYPE>>)", AND ADD IT TO <<INTERNAL INFORMATION>>
2109: ELSE REPEAT THE FOLLOWING STEPS AS FOR EACH ITEM <<ITEM>> WITHIN <<TABLE>>
2110: GENERATE “(<<ITEM>>, <<TYPE>>, <<CALCULATION PROCESSING>>),", AND ADD IT TO <<INTERNAL INFORMATION>>
2111: END_IF
2112: DELETE “,” AT THE END OF <<INTERNAL INFORMATION>>, AND ADD “])”

2113: GENERATE “PROCESSING CONDITION: <<PROCESSING CONDITION>>", AND ADD IT TO <<INTERNAL INFORMATION>>
2114: REPEAT THE FOLLOWING STEPS AS FOR THE OTHER ATTRIBUTES

2115: GENERATE “<<ATTRIBUTE NAME>> : <<ATTRIBUTE VALUE>>", AND ADD IT TO <<INTERNAL INFORMATION>>

FIG. 22

```
2201: PROGRAM NAME :SALES_CALCULATION
2202: TABLE        :[(SALES VOLUME,INPUT,[(CODE. char(4))
2203:                                      (SALES,number(6))])
2204:                (GOODS,INPUT,        [(CODE. char(4))
2205:                                      (NAME. char(13))
2206:                                      (PRICE,number(8))])
2207:                (SALES LIST,OUTPUT,[(CODE. char(4),     "SALES VOLUME.CODE")
2208:                                      (NAME. char(13),  "GOODS.NAME")
2209:                                      (TOTAL,number(14),"SALES VOLUME.SALES
2210:                                                        *GOODS.PRICE")])
2211: SELECT CONDITION:"SALES VOLUME.SALES > 10 and
2212:                   SALES VOLUME.CODE=GOODS.CODE"
2213: INITIAL PROCESSING:Init_module;
2214: END PROCESSING    :End_module;
```

FIG. 23

```
2301:  ["(<<ATTRIBUTE NAME>> : <<ATTRIBUTEVALUE>>)"*]
```

FIG. 24

```
2401:  [(PROGRAM NAME        : "SALES_CALCULATION")
2402:   (INITIAL PROCESSING: "Init_module;")
2403:   (END PROCESSING      : "End_module;")
2404:  ]
```

FIG. 25

```
2501: [("INPUT TABLE"      : [(TABLE NAME:[ITEM NAME]*)]*)
2502:  ("SELECT CONDITION" : PROCESSING CONDITIONAL CHARACTER STRING)
2503:  ("CALCULATION PROCESSING":[CHARACTER STRING OF THE VALUE IN
                                  CALCULATION PROCESSING COLUMN]*)
2504:   ]
```

FIG. 26

```
2601:[(INPUT TABLE:(SALES VOLUME:[CODE SALES])
2602               (GOODS:[CODE NAME PRICE])
2603:(SELECT CONDITON:"SALES VOLUME.SALES>10 and SALES VOLUME.CODE=GOODS.CODE")
2604:(CALCULATION PROCESSING:["SALES VOLUME.CODE
2605:                         "GOODS.NAME"
2606:                         "SALES VOLUME.SALES * GOODS.PRICE"])
2607:]
```

FIG. 27

```
2701:  ("OUTPUT TABLE" :[(TABLE NAME:[(ITEM NAME TYPE
                         CALCULATION PROCESSING)]*)]*)
```

FIG. 28

```
2801: (OUTPUT TABLE:[(SALES LIST:[(CODE "char(4)"     "SALES VOLUME.CODE")
2802:                             (NAME "char(13)"    "GOODS.NAME)
2803:                             (TOTAL"number(14)"  "SALES VOLUME.SALES
2804:                                                       *GOODS.PRICE")
2805:                            ]
2806:                   )]
2807: )
```

FIG. 29

```
2900: RECEIVE THE CURSOR DEFINITION INFORMATION
2901: MAKE <<INPUT TABLE NAME STRING>> EMPTY
2902: MAKE <<SELECT ITEM STRING>> EMPTY
2903: REPEAT THE FOLLOWING STEPS AS FOR <<INPUT TABLE >>
      THAT IS AN INPUT TABLE WITHIN
      THE CURSOR DEFINITION INFORMATION

2904: REPEAT THE FOLLOWING STEPS AS FOR <<ITEM>>
      THAT IS AN ITEM OF <<INPUT TABLE>> WITHIN
      THE CURSOR DEFINITION INFORMATION
2905: IF THE "<<INPUT TABLE>>.<<ITEM>>" IS USED IN THE
      CALCULATION PROCESSING WITHIN
      THE CURSOR DEFINITION INFORMATION?
2906: THEN ADD "<<INPUT TABLE>>.<<ITEM>>
      <<INPUT TABLE>>_<<ITEM>>," TO <<SELECT ITEM STRING>>
2907: IF <<INPUT TABLE>> EXISTS WITHIN
      <<INPUT TABLE NAME STRING>>?
2908: THEN
2909: ELSE ADD "<<INPUT TABLE>>," TO THE END OF
      <<INPUT TABLE NAME STRING>>
2910: END_IF
2911: ELSE
2912: END_IF

2913: DELETE "," AT THE END WITHIN <<SELECT ITEM STRING>>
2914: DELETE "," AT THE END WITHIN
      <<INPUT TABLE NAME STRING>>
2915: SET THE CONTENT SPECIFIED AS
      THE SELECT CONDITION WITHIN THE CURSOR DEFINITION
      INFORMATION, IN <<CONDITIONAL CLAUSE>>
2916: INSERT THE ABOVE <<SELECT ITEM STRING>> INTO
      <<SELECT ITEM STRING INSERTING POSITION>>
      OF THE CURSOR DEFINITION STATEMENT SKELETON
2917: INSERT THE ABOVE <<INPUT TABLE NAME STRING>>
      INTO <<INPUT TABLE INSERTING POSITION>>
      OF THE CURSOR DEFINITION STATEMENT SKELETON
2918: INSERT THE ABOVE <<CONDITIONAL CLAUSE>> INTO
      <<SELECT CONDITION INSERTING POSITION>>
      OF THE CURSOR DEFINITION STATEMENT SKELETON
2919: OUTPUT THE COMPLETED CURSOR
      DEFINITION STATEMENT
```

FIG. 30

```
_CURSOR DEFINITION
cursor CSR_0 is
select
<<SELECT ITEM STRING INSERTING POSITION>>
from <<INPUT TABLE STRING INSERTING POSITION>>
where <<SELECT CONDITION INSERTING POSITION>>
;
_VARIABLE DEFINITION FOR CURSOR
W_0 CSR_0% rowtype;
```

FIG. 31

```
_CURSOR DEFINITION
cursor CSR_0 is
select
  SALES VOLUME.CODE  SALES VOLUME_CODE,
  SALES VOLUME.SALES  SALES VOLUME_SALES,
  GOODS.NAME  GOODS _NAME,
  GOODS.PRICE  GOODS_PRICE,
from  SALES VOLUME,GOODS
where SALES VOLUME. SALES > 10 and
      SALES VOLUME.CODE=GOODS.CODE
;
_VARIABLE DEFINITION FOR CURSOR
W_0 CSR_0% rowtype;
```

F I G. 32

3200: RECEIVE THE OUTPUT ITEM PROCESSING INFORMATION
3201: MAKE <<WORK VARIABLE DEFINITION STATEMENT STRING>> EMPTY
3202: DEFINE <<OUTPUT TABLE NUMBER>> AS 1
3203: REPEAT THE FOLLOWING STEPS IN THE ORDER WRITTEN IN THE SPECIFICATION AS FOR THE TABLES<<OUTPUT TABLE>> IN WHICH OUTPUT IS SELECTED IN INPUT/OUTPUT DISCRIMINATION WITHIN THE OUTPUT ITEM INFORMATION

3204: SET "<<OUTPUT TABLE>>_<<OUTPUT TABLE NUMBER>> _TYPE" IN <<WORK VARIABLE TYPE NAME>>
3205: MAKE <<OUTPUT ITEM DEFINITION>> EMPTY
3206: REPEAT THE FOLLOWING STEPS AS FOR EACH ITEM <<ITEM>> OF <<OUTPUT TABLE>> WITHIN THE OUTPUT ITEM INFORMATION
3207: SET THE TYPE CORRESPONDING TO <<ITEM>> OF <<OUTPUT TABLE >> WITHIN THE OUTPUT ITEM INFORMATION IN <<TYPE>>
3208: ADD ",<<ITEM>> <<TYPE>>" TO <<OUTPUT ITEM DEFINITION>>
3209: SET "<<OUTPUT TABLE>>_<<OUTPUT TABLE NUMBER>> <<WORK VARIABLE TYPE
3210: NAME>>;" IN <<VARIABLE DEFINITION>>
3211: INSERT <<WORK VARIABLE TYPE NAME>> INTO <<WORK VARIABLE TYPE NAME INSERTING POSITION>> OF THE WORK VARIABLE SKELETON
3212: INSERT <<OUTPUT ITEM DEFINITION>> INTO <<OUTPUT ITEM DEFINITION INSERTING POSITION>> OF THE WORK VARIABLE SKELETON
3213: INSERT <<VARIABLE DEFINITION>> INTO <<VARIABLE DEFINITION INSERTING POSITION>> OF THE WORK VARIABLE SKELETON
3214: ADD THE WORK VARIABLE SKELETON TO THE END OF <<WORK VARIABLE DEFINITION STATEMENT STRING>>
3215: OUTPUT TABLE NUMBER : = OUTPUT TABLE NUMBER+1;

3216: OUTPUT <<WORK VARIABLE DEFINITION STATEMENT STRING>>

FIG. 33

```
3301: _WORK VARIABLE DEFINITION FOR OUTPUT
3302: type<<WORK VARIABLE TYPE NAME INSERTING POSITION>>is record(
3303: W_ROWID rowid
3304: <<OUTPUT ITEM DEFINITION INSERTING POSITION>>
3305: );
3306: <<VARIABLE DEFINITION STATEMENT INSERTING POSITION>>
```

FIG. 34

```
3401: _WORK VARIABLE DEFINITION FOR OUTPUT
3402: type SALES LIST_1_Type is record(
3403: W_ROWID rowid
3404: ,CODE char(4)
3405: ,NAME char(13)
3406: ,TOTAL number(14)
3407: );
3408: SALES LIST_1 SALES LIST_1_Type;
```

FIG. 35

3500: RECEIVE THE OUTPUT ITEM PROCESSING INFORMATION
3501: MAKE <<OUTPUT PROCESSING STATEMENT STRING>> EMPTY
3502: DEFINE <<OUTPUT TABLE NUMBER>> AS 1
3503: REPEAT THE FOLLOWING STEPS IN THE ORDER WRITTEN IN THE SPECIFICATION AS FOR THE TABLES <<OUTPUT TABLE>> IN WHICH OUTPUT IS SELECTED IN INPUT/OUTPUT DISCRIMINATION WITHIN THE OUTPUT ITEM PROCESSING INFORMATION

3504: MAKE <<CALCULATION STATEMENT STRING>> EMPTY
3505: MAKE <<ITEM NAME STRING>> EMPTY
3506: MAKE <<VARIABLE NAME STRING>> EMPTY
3507: REPEAT THE FOLLOWING STEPS AS FOR EACH ITEM <<ITEM>> OF <<OUTPUT TABLE>> WITHIN THE OUTPUT ITEM PROCESSING INFORMATION

REPLACE "." WITH "_", IN THE VALUES OF
THE CALCULATION PROCESSING COLUMN
CORRESPONDING TO <<ITEM>> OF <<OUTPUT TABLE>>
WITHIN THE OUTPUT ITEM PROCESSING INFORMATION,
3508: AND SET THE VARIABLE WITH "W_0." ADDED TO
3509: THE TOP OF THE TABLE NAME, IN <<CALCULATION
3510: EXPRESSION>>ADD "<<OUTPUT TABLE>>_<<OUTPUT TABLE
3511: NUMBER>>.<<ITEM NAME>>:=<<CALCULATION
3512: EXPRESSION>>;" TO THE END OF <<CALCULATION
3513: STATEMENT STRING>>ADD "<<ITEM>>," TO THE END OF
<<ITEM NAME STRING>>ADD
"<<OUTPUT TABLE>>_<<OUTPUT TABLE NUMBER>>.
<<ITEM>>," TO THE END OF <<VARIABLE NAME STRING>>

3514: DELETE THE LAST "," WITHIN <<ITEM NAME STRING>>
3515: LETE THE LAST "," WITHIN <<VARIABLE NAME STRING>>
3516: INSERT <<CALCULATION STATEMENT STRING>> INTO <<ITEM CALCULATION STATEMENT STRING INSERTING POSITION>> OF THE OUTPUT PROCESSING STATEMENT SKELETON
3517: INSERT <<OUTPUT TABLE>> INTO <<OUTPUT TABLE NAME INSERTING POSITION>> OF THE OUTPUT PROCESSING STATEMENT SKELETON
3518: INSERT <<ITEM NAME STRING>> INTO <<OUTPUT ITEM NAME INSERTING POSITION>> OF THE OUTPUT PROCESSING STATEMENT SKELETON
3519: INSERT <<VARIABLE NAME STRING>> INTO <<WORK VARIABLE NAME INSERTING POSITION>> OF THE OUTPUT PROCESSING STATEMENT SKELETON
3520: ADD THE OUTPUT PROCESSING STATEMENT SKELETON TO THE END OF <<OUTPUT PROCESSING STATEMENT STRING>>
3521: OUTPUT TABLE NUMBER := OUTPUT TABLE NUMBER +1;

3522: OUTPUT <<OUTPUT PROCESSING STATEMENT STRING>>

F I G. 36

OUTPUT STATEMENT SKELETON

```
3601: _CALCULATION OF EACH OUTPUT ITEM
3602: <<ITEM CALCULATION STATEMENT INSERTING POSITION>>
3603: _OUTPUT PROCESSING TO AN OUTPUT TABLE
3604: SQLRESULT :=0;
3605: begin
3606:     insert into<<OUTPUT TABLE NAME INSERTING POSITION>>(
3607:         <<OUTPUT ITEM NAME INSERTING POSITION>>
3608:     ) values(
3609:         <<WORK VARIABLE NAME INSERTING POSITION>>
3610:     );
3611:     _EXCEPTION PROCESSING
3612: exception
3613: when others then
3614:     SQLRESULT :=SQLCODE;
3615: end;
```

FIG. 37

```
_CALCULATION OF EACH OUTPUT ITEM
SALES LIST_1.CODE:=W_0.SALES VOLUME_CODE;
SALES LIST_1.NAME:=W_0.GOODS_NAME;
SALES LIST_1.TOTAL:=W_0.SALES VOLUME_SALES
                   * W_0.GOODS_PRICE;
_OUTPUT PROCESSING TO AN OUTPUT TABLE
SQLRESULT :=0;
begin
   insert into SALES LIST(
        CODE,
        NAME,
        TOTAL
   ) values(
        SALES LIST_1.CODE
        SALES LIST_1.NAME
        SALES LIST_1.TOTAL
   );
   _EXCEPTION PROCESSING
exception
when others then
    SQLRESULT :=SQLCODE;
end;
```

FIG. 38

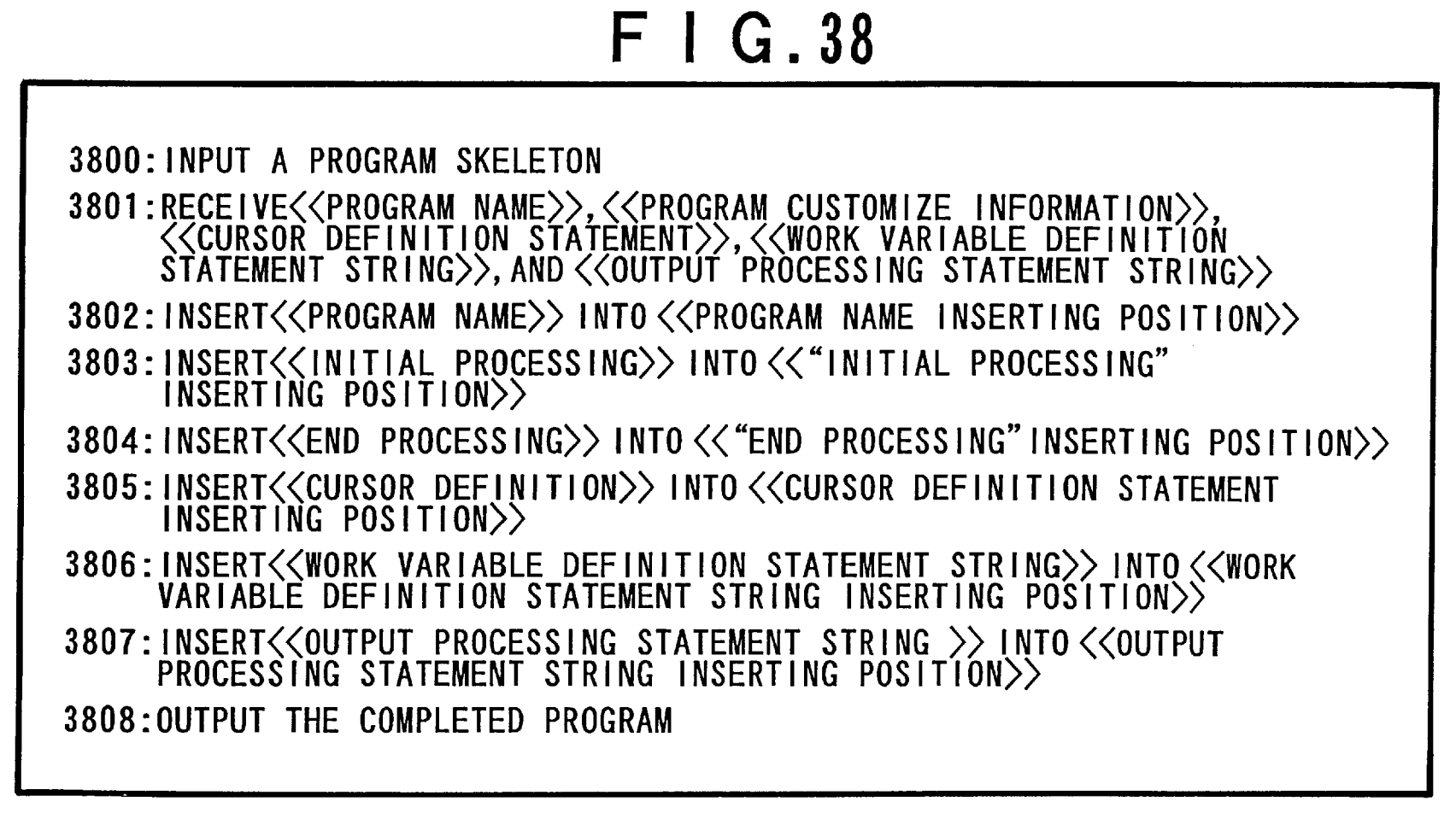

3800: INPUT A PROGRAM SKELETON

3801: RECEIVE<<PROGRAM NAME>>, <<PROGRAM CUSTOMIZE INFORMATION>>, <<CURSOR DEFINITION STATEMENT>>, <<WORK VARIABLE DEFINITION STATEMENT STRING>>, AND <<OUTPUT PROCESSING STATEMENT STRING>>

3802: INSERT<<PROGRAM NAME>> INTO <<PROGRAM NAME INSERTING POSITION>>

3803: INSERT<<INITIAL PROCESSING>> INTO <<"INITIAL PROCESSING" INSERTING POSITION>>

3804: INSERT<<END PROCESSING>> INTO <<"END PROCESSING" INSERTING POSITION>>

3805: INSERT<<CURSOR DEFINITION>> INTO <<CURSOR DEFINITION STATEMENT INSERTING POSITION>>

3806: INSERT<<WORK VARIABLE DEFINITION STATEMENT STRING>> INTO <<WORK VARIABLE DEFINITION STATEMENT STRING INSERTING POSITION>>

3807: INSERT<<OUTPUT PROCESSING STATEMENT STRING >> INTO <<OUTPUT PROCESSING STATEMENT STRING INSERTING POSITION>>

3808: OUTPUT THE COMPLETED PROGRAM

FIG. 39

```
3901:   create or replace function
        <<PROGRAM NAME INSERTING POSITION>>()
        return number is
3902:    begin
3903:      declare
3904:    /*DECLARATIVE SECTION*/
3905:    --COMMON CONSTANT DEFINITION
3906:        RET_VAL   number   : = 0 ;
3907:    --INTERMEDIATE VARIABLE DEFINITION
3908:    SQLRESULT   number   : = 0 ;
3909:   <<CURSOR DEFINITION STATEMENT INSERTING
        POSITION>>
3910:   <<WORK VARIABLE DEFINITION STATEMENT
        STRING INSERTING POSITION>>
3911:    begin
3912:    /*INITIAL PROCESSING*/
3913:     -- INITIAL PROCESSING OF A USER DEFINITION
3914: <<"INITIAL PROCESSING" INSERTING POSITION>>
3915:     --OPEN AN INPUT TABLE CURSOR
3916:            open CSR_0 ;
3917: /*MAIN PROCESSING*/
3918:   --EDITING PROCESSING MAIN BLOCK (MAIN LOOP)
3919:        loop
3920:      --READ ONE RECORD OF INPUT TABLE CURSOR
3921:      fetch CSR_0 into W_0 ;
3922:
3923:      --PROCESSING AT THE END OF FETCH
         OF INPUT TABLE
3924:      if CSR_0% notfound then
3925:         exit;
3926:      end if;
3927:      <<OUTPUT PROCESSING STATEMENT STRING
         INSERTING POSITION>>
3928:      end loop;
3929: /*END PROCESSING*/
3930:    <<"END PROCESSING" INSERTING POSITION>>
3931:       close CSR_0 ;
3932:    --COMMIT PROCESSING
3933:    COMMIT WORK;
3934:    return SQLRESULT;
3935: /*EXCEPTION PROCESSING*/
3936:    --EXCEPTION PROCESSING
3937:    exception
3938:       when others then
3939:          SQLRESULT : = SQLCODE;
3940:          ROLLBACK WORK;
3941:          raise;
3942:      end;
3943: end;
```

FIG.40A

```
4001: create or replace function SALES_CALCULATION
      ()return number is
4002: begin
4003:    declare
4004: /*DECLARATIVE SECTION*/
4005: --COMMON CONSTANT DEFINITION
4006: RET_VAL  number  : = 0 ;
4007: --INTERMEDIATE VARIABLE DEFINITION
4008: SQLRESULT  number  : = 0 ;
4009: --CURSOR DEFINITION
4010: cursor  CSR_0  is
4011: select
4012: SALES VOLUME.CODE  SALES VOLUME_CODE,
4013: SALES VOLUME.  SALES  SALES VOLUME_ SALES,
4014: GOODS.NAME  GOODS_NAME,
4015: GOODS.PRICE  GOODS_PRICE,
4016: from SALES VOLUME,  GOODS
4017: where SALES VOLUME. SALES>10 and
4018:    SALES VOLUME.CODE= GOODS.CODE
4019: ;
4020: --VARIABLE DEFINITION FOR CURSOR
4021: W_0  CSR_0%row type;
4022: --WORK VARIABLE DEFINITION FOR OUTPUT
4023: type SALES LIST_1_Type is record(
4024:   W_ROWID  rowid
4025:   ,CODE char (4)
4026:   ,NAME char (13)
4027:   ,TOTAL number (14)
4028: ) ;
4029: SALES LIST_1  SALES LIST_1_ Type;
4030: begin
4031: /*INITIAL PROCESSING*/
4032: -- INITIAL PROCESSING OF A USER DEFINITION
4033: Init_module;
4034: --OPEN AN INPUT TABLE CURSOR
4035: open CSR_0 ;
4036: /*MAIN PROCESSING*/
4037:  --EDITING PROCESSING MAIN BLOCK (MAIN LOOP)
4038:  loop
4039:  --READ ONE RECORD OF INPUT TABLE CURSOR
4040:  fetch  CSR_0  into  W_0;
4041:  --PROCESSING AT THE END OF FETCH OF
      INPUT TABLE
                    :
```

FIG. 40B

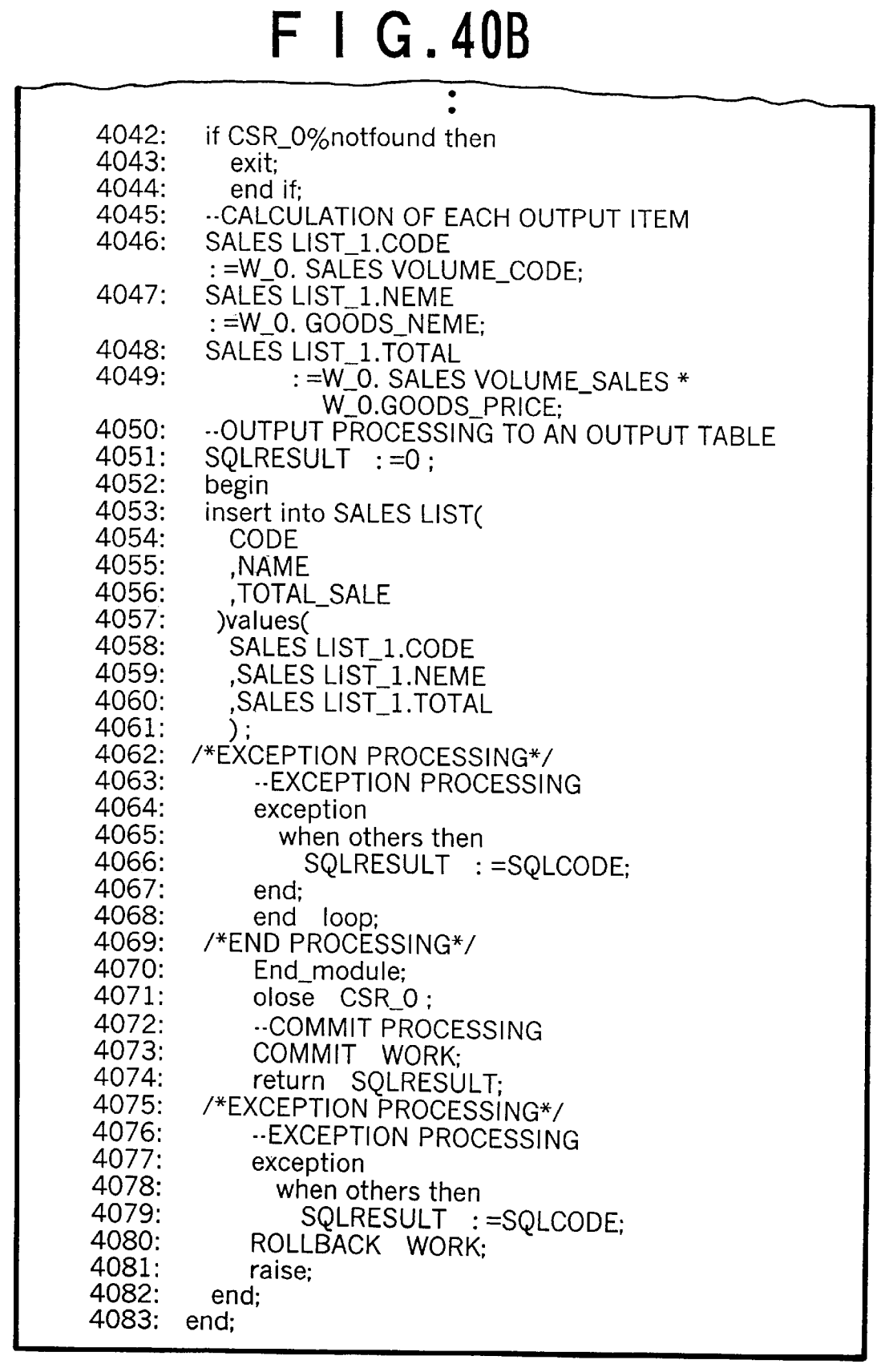

```
:
if CSR_0%notfound then
   exit;
   end if;
--CALCULATION OF EACH OUTPUT ITEM
SALES LIST_1.CODE
 : =W_0. SALES VOLUME_CODE;
SALES LIST_1.NEME
 : =W_0. GOODS_NEME;
SALES LIST_1.TOTAL
          : =W_0. SALES VOLUME_SALES *
             W_0.GOODS_PRICE;
--OUTPUT PROCESSING TO AN OUTPUT TABLE
SQLRESULT   : =0 ;
begin
insert into SALES LIST(
   CODE
   ,NAME
   ,TOTAL_SALE
 )values(
   SALES LIST_1.CODE
   ,SALES LIST_1.NEME
   ,SALES LIST_1.TOTAL
   ) ;
/*EXCEPTION PROCESSING*/
      --EXCEPTION PROCESSING
      exception
         when others then
            SQLRESULT   : =SQLCODE;
      end;
      end   loop;
 /*END PROCESSING*/
      End_module;
      olose   CSR_0 ;
      --COMMIT PROCESSING
      COMMIT   WORK;
      return   SQLRESULT;
 /*EXCEPTION PROCESSING*/
      --EXCEPTION PROCESSING
      exception
         when others then
            SQLRESULT   : =SQLCODE;
      ROLLBACK   WORK;
      raise;
   end;
end;
```

SYSTEM, METHOD AND COMPUTER PROGRAM PRODUCT FOR AUTOMATIC GENERATION OF DATA PROCESSING PROGRAM

BACKGROUND OF THE INVENTION

1. Technical Field of the Invention

The present invention relates to an automatic generation of a program, and more particularly to a technique of automatically generating a data processing program for processing data with reference to the data of a table of a database constructed on an information processing system, storing the processing result once more in the table of the database, and updating or deleting the data of the table of the database based on the processing result.

2. Description of the Prior Art

Techniques for automatically generating a data processing program has been developed.

For example, JP1-147621 A (1989) discloses a system and method for generating automatically such data processing programs. The disclosed system comprises: input means for inputting specifications concerning data layout wherein attributes such as type and digit of each data item included in files and documents are defined, and for inputting specifications concerning calculation formulas; and program generation means for generating the corresponding batch work program. Further, the automatic program generating method comprises the steps of: inputting information on execution order such as data input/output order of files and documents and calculation order, into the input means of the specifications information; and generating the information on a program structure of a program to be generated, from the execution order information, in the program generating means.

A block diagram of the conventional program generation system as disclosed in JP1-147621 A (1989) is shown in FIG. 41. The specifications are inputted from a terminal into specifications input unit which further generates input/output relations, layout, generation formula and decision tables. Further, a data defining unit is generated from an input/output relation unit and a layout unit. A data editing unit is generated from the input/output relation unit and a generation formula unit. A program structure unit is generated from the input/output relation unit and a decision table unit. Finally, a program combining unit combines the data defining unit, the data editing unit, and the program structure unit.

Further, JP3-182932 A (1991) discloses a program automatic generating technique for the purpose of preventing errors and improving productivity. Concretely, this technique solves problems in program generation such as induction of user's errors, or low productivity due to an increase in description amounts. Here, the problems arise from the fact that the COBOL language is so different from the SQL that it is laborious to describe a program by embedding a program of the SQL language in a program of the COBOL language.

A block diagram of the program generation system as disclosed in JP3-182932 A (1991) is shown in FIG. 42. A processing specification is inputted into data analysis unit. Then, data analysis and procedure analysis are executed. Further, the output from the procedure analysis unit is inputted into a definition unit, so as to automatically generate the SQL declarative section and the SQL communication area unfolding statement.

Although various automatic generating techniques have been disclosed, there is not found any article which describes an automatic generating technique of a data processing program for referring to, updating, and deleting the data of a table of a database constructed on an information processing system by use of a cursor definition statement. Concretely, JP1-147621 A (1989) merely discloses an automatic generation of a program dealing with a usual file and document, and use of a database is not assumed there. Further, JP3-182932 (1991) does not disclose automatic generation of cursor definition statement.

Generally, in a program dealing with a usual file and document, data is obtained from an input file, calculation processing is performed, and the result is stored in a new file. Therefore, also in JP1-147621 A (1989), on the assumption that a new file or document is generated as the output processing, the data of the existing file is never deleted and changed. The case of a database system, however, is characterized in that update and delete of an existing table by the record unit can be executed safely, and therefore, in a data processing program using a database, according to the cursor definition statement indicating which part of which table should be processed, data is obtained from the table input, calculation processing is performed, and based on the result, as is often the case, a new table is created, the existing table is updated, or deleted.

In the case of manual generation of this data processing program with reference to a detailed design similarly to the conventional way, there is a problem that a lot of processes are required, an error caused by human hands cannot be prevented, and that consistency of the detailed design and the program cannot be guaranteed. In the case of developing a large scale business program, it is necessary to install not only the business requirements but also the processing in the case of occurrence of system failure and access failure to a database or a network, which is difficult for a programmer of little experience of a business program, thereby causing a problem of deteriorating the quality of the developed program and the productivity of development. Therefore, the automatic generating technique of this kind of data processing program becomes a very important theme.

SUMMARY OF THE INVENTION

An object of the present invention is to automatically generate a data processing program for referring to, updating, or deleting the data of a table of a database.

Another object of the present invention is to reduce a user's labor of describing specifications, by reducing the kind of information to be described in the specifications of the business requirements.

Further, another object of the present invention is to automatically generate various data processing programs from the specifications of the same business requirements.

The data processing program automatic generation system of the present invention for automatically generating a data processing program for referring to, updating, and deleting data of a table of a database, comprises: means for generating a cursor definition statement, a work variable definition statement, and an output processing statement, based on information obtained from specifications; and means for inserting the generated cursor definition statement, work variable definition statement, output processing statement, and program customize information within the specifications into each corresponding position of a program skeleton, including the program of a fixed portion regardless of the content of specifications and an inserting position of a piece of a program corresponding to a portion changeable according to the specifications of the data processing program,thereby completing the data processing program and outputting the same. More specifically, it comprises:

- specification input means for inputting specifications including program name, input table item definition, select item definition, output table item definition, output table processing definition, select condition definition, and program customize information;
- program skeleton customize information obtaining means for taking out the program name and the program customize information, as the information for customizing a program skeleton, from the specifications input by the specifications input means;
- cursor definition information obtaining means for taking out the input table item definition, the select item definition, and the select condition definition, from the specifications input by the specifications input means;
- output item processing information obtaining means for taking out the output table item definition and the output table processing definition, from the specifications input by the specifications input means;
- cursor definition statement generating means for generating a cursor definition statement from the information obtained by said cursor definition information obtaining means;
- work variable definition statement generating means for generating a work variable definition statement, from an output table belonging to the processing type "insert", of the output table item definition obtained by the output item processing information obtaining means;
- output processing statement generating means for generating an output processing statement including a processing condition statement, an item calculation statement, and an insert statement in the case of the processing type "insert", generating an output processing statement including a processing condition statement and an update statement in the case of the processing type "update", and generating an output processing statement including a processing condition statement and a delete statement in the case of the processing type "delete", from the output table item definition and the output table processing definition obtained by the output item processing information obtaining means; and
- automatic program combining means for completing and outputting a program by inserting the program name and the program customize information obtained by the program skeleton customize information obtaining means, the cursor definition statement generated by the cursor definition statement generating means, the work variable definition statement generated by the work variable definition statement generating means, and the output processing statement generated by the output processing statement generating means, into the respective corresponding inserting positions of a program skeleton, including the program of a fixed portion regardless of the content of specifications and an inserting position of a piece of the program corresponding to a portion changeable according to specifications.

As mentioned above, a data processing program for referring to, updating, and deleting the data of a table of a database using a cursor definition statement can be automatically generated by generating the cursor definition statement, the work variable definition statement, and the output processing statement from specifications, and by inserting them into the corresponding inserting positions of the program skeleton prepared in advance. Since the program customize information of the specifications can be inserted into the corresponding inserting position of the program skeleton, the initial processing and the end processing, for example, specified by a user as the program customize information, can be built in, thereby making it easy to customize a program. Further, a processing program to cope with occurrence of a database access error, or a program for following a program rule obeyed by a lot of people concerned in the development, is established in advance, in a part of the fixed portion of a program regardless of the content of specifications, thereby reducing a user's trouble of creating this part and preventing a user's mistake.

Further, for the purpose of reducing a user's trouble of describing specifications by reducing the kind of the information to be described in the specifications, the data processing program automatic generation system according to the present invention is constituted so that the cursor definition statement generating means generates a select item definition from the input table item definition, select condition definition, and output table processing definition, thereby generating a cursor definition statement from this generated select item definition and the select condition definition, as another structure. In this structure, a user can save a trouble of generating the select item definition. As further another structure, the specifications input means inputs all the input table names and output table names for use in the processing and retrieves all the item names of the corresponding input table and output table from the table definition information of a database to obtain the same. Thus, a user can save a trouble of generating an input table item definition and output table item definition. Further, the specifications input means represents the type information and all the item names of the obtained input table and output table on a screen, thereby making it possible for specifications describer to specify the specifications information other than the input table item definition and output table item definition, resulting in facilitating the description of the output table item definition, the output table processing definition, the select condition definition, and the like easy.

Further, in order to make it possible to automatically generate various data processing programs from the specifications of the same business requirements, the data processing program automatic generation system according to the present invention comprises a program skeleton library for storing several kinds of program skeletons including a program of the fixed portion regardless of the content of specifications and an inserting position of a piece of the program corresponding to the portion changeable according to specifications, and a program skeleton selecting means for selecting one program skeleton that a user specifies from this program skeleton library and passing it to the automatic program combining means.

According to the present invention, when a software developer develops a data processing program for newly creating, updating, or deleting the data of a database table using a cursor definition statement, only describing specifications of processing can generate a program automatically and he or she can make use of it.

In the structure of automatic generation of a select item definition, a software developer can save the trouble of describing specifications and reduce a risk of producing an error. Similarly, in the structure of retrieving and obtaining the input table item definition and the output table item definition from the table definition information of a database, a software developer can save the trouble of describing specifications and reduce a risk of producing an error.

Further, in the structure of selecting any program skeleton from a plurality of kinds of program skeletons, various data processing programs such as a program written in a different programming language, a program in a different algorithm, a program based on the different method of processing abnormal operation, or the like can be automatically generated, from specifications of the same business requirements.

Further, since the whole program can be automatically generated, manual generation of a program is not necessary and a trouble of program development can be reduced extremely.

Further, since the manual work can be reduced extremely in the program development, an opportunity of producing a mistake by the manual work can be reduced extremely, thereby reducing the mixing of an error into a program, to a high degree.

Further, by embedding the processing to cope with access failure to a database and a network, or system failure, in other words, the processing that is filled with the knowledge of a program developer of extensive experience, within a program skeleton, a program for performing the complicate processing can be automatically generated from the specifications in which only the business requirements are described, thereby making it possible even for a program developer of less experience of developing a business program to develop a program of high quality at the same level as that of an experienced developer.

Further, in maintenance of a system, maintenance is performed not by a program, but by specifications, thereby making the maintenance much easier. This is why, automatic generation of a program from specifications means one-to-one correspondence of the program and the specifications, in the necessity of amending a system, not the program is directly amended, but the specifications are amended, thereby automatically generating the program from the amended specification, for the maintenance.

BRIEF EXPLANATION OF THE DRAWINGS

FIGS. 2A and 2B are views showing the structure of the specifications in the first form of the embodiment according to the present invention and necessary information for every processing type in the output table processing definition of the specifications.

FIG. 10 is a view showing the structure of the program skeleton in the first form of the embodiment according to the present invention.

FIG. 19 is a view showing the structure and an example of the embodiment according to the present invention.

FIG. 20 is a view for use in describing the meaning of an example of the specifications according to the embodiment of the present invention.

FIG. 21 is a flow chart showing the processing of the specifications input means according to the embodiment of the present invention.

FIG. 22 is a view showing the structure and an example of the internal information after the specifications are input, according to the embodiment of the present invention.

FIG. 23 is a view showing the structure of the program skeleton customize information that the program skeleton customize information obtaining means passes to the automatic program combining means, according to the embodiment of the present invention.

FIG. 24 is a view showing an example of the program skeleton customize information that the program skeleton customize information obtaining means passes to the automatic program combining means, according to the embodiment of the present invention.

FIG. 25 is a view showing the structure of the cursor definition information that the cursor definition information obtaining means passes to the cursor definition statement generating means, according to the embodiment of the present invention.

FIG. 26 is a view showing an example of the cursor definition information that the cursor definition information obtaining means passes to the cursor definition statement generating means, according to the embodiment of the present invention.

FIG. 27 is a view showing the structure of the output item information that the output item processing information obtaining means passes to the work variable definition statement generating means and the output processing statement generating means, according to the embodiment of the present invention.

FIG. 28 is a view showing an example of the output item information that the output item processing information obtaining means passes to the work variable definition statement generating means and the output processing statement generating means, according to the embodiment of the present invention.

FIG. 29 is a view showing the content of the processing of the cursor definition statement generating means, according to the embodiment of the present invention.

FIG. 30 is a view showing the cursor definition statement skeleton used in the cursor definition statement generating means, according to the embodiment of the present invention.

FIG. 31 is a view showing an example of the cursor definition statement generated by the cursor definition statement generating means, according to the embodiment of the present invention.

FIG. 32 is a view showing the content of the processing of the work variable definition statement generating means, according to the embodiment of the present invention.

FIG. 33 is a view showing the work variable definition statement skeleton used in the work variable definition statement generating means, according to the embodiment of the present invention.

FIG. 34 is a view showing an example of the work variable definition statement generated by the work variable definition statement generating means, according to the embodiment of the present invention.

FIG. 35 is a view showing the content of the processing of the output processing statement generating means, according to the embodiment of the present invention.

FIG. 36 is a view showing the output processing statement skeleton used in the output processing statement generating means, according to the embodiment of the present invention.

FIG. 37 is a view showing an example of the output processing statement generated by the output processing statement generating means, according to the embodiment of the present invention.

FIG. 38 is a view showing the content of the processing of the automatic program combining means, according to the embodiment of the present invention.

FIG. 39 is a view showing the program skeleton according to the embodiment of the present invention.

FIGS. 40A and 40B are views showing an example of the output program generated by the automatic program combining means, according to the embodiment of the present invention.

PREFERRED EMBODIMENT OF THE INVENTION

First Form of Embodiment

Figure 1:
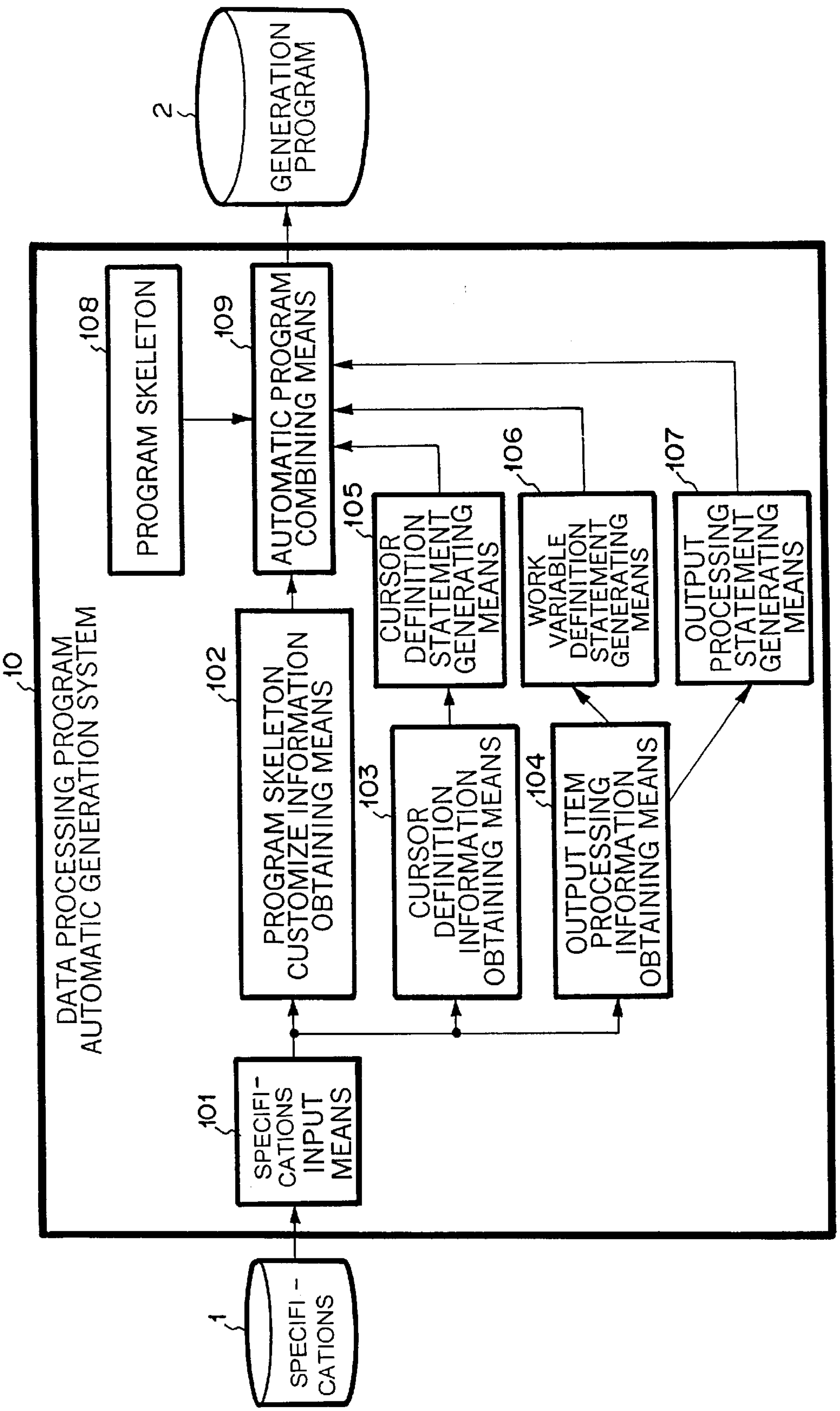
FIG. 1 is a block diagram showing the structure of the first form of the embodiment of the present invention.
Figure 17:
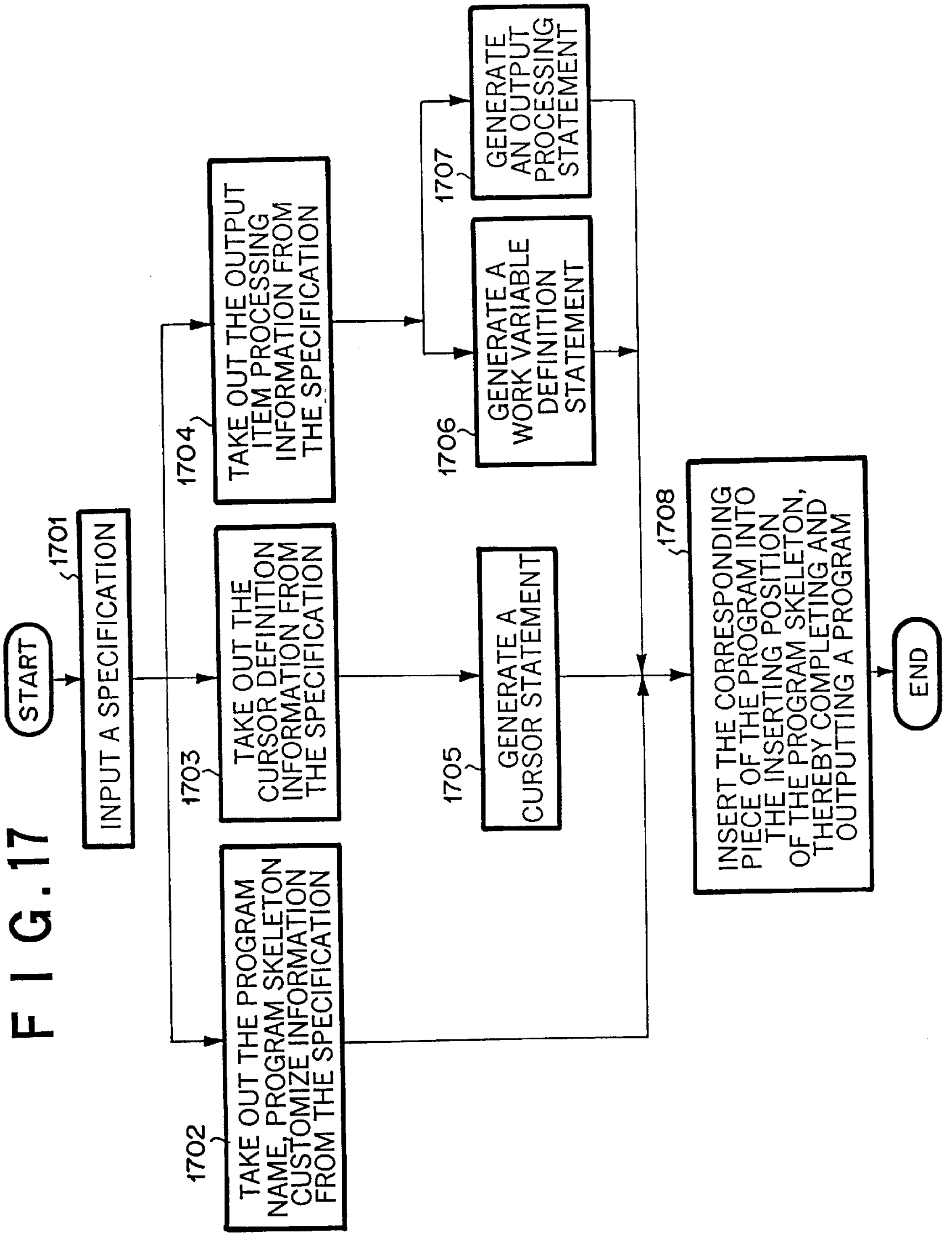
FIG. 17 is a flow chart showing the processing example in the first form of the embodiment according to the present invention.

FIG. 1 is a block diagram showing the constitutional example of a first form of an embodiment of a data processing program automatic generating system according to the present invention, and FIG. 17 is a flow chart showing the outline of the processing thereof. At first, the outline of the first form of the embodiment will be described with reference to FIG. 1 and FIG. 17.

In FIG. 1, specifications 1 indicating business requirements includes program name, input table item definition, select item definition, output table item definition, output table processing definition, select condition definition, and program customize information, as the satisfactory specifications of a program to be developed. First, in 1701 of FIG. 17, specifications input means 101 inputs this specification 1. Next, a program skeleton customize information obtaining means 102 fetches the program name and the program customize information, out of the input specifications, as the information necessary for customizing the program skeleton, and passes the same data to an automatic program combining means 109 (1702). A cursor definition information obtaining means 103 fetches the input table item definition, the select item definition, and the select condition definition, out of the input specifications, as the information necessary for generating a cursor definition statement, and passes the same data to a cursor definition statement generating means 105 (1703). An output item processing information obtaining means 104 fetches the output table item definition and the output table processing definition as the output item processing information, out of the input specifications, as the information necessary for generating a work variable definition statement and an output processing statement, and passes the same data to a work variable definition statement generating means 106 and an output processing statement generating means 107 (1704).

This time, the cursor definition statement generating means 105 processes the information received from the cursor definition information obtaining means 103, generates a cursor definition statement for defining a table and items to be referred to in the processing specified in the specifications, of the tables in the database, and passes it to the automatic program combining means 109 (1705). The work variable definition statement generating means 106 processes the information received from the output item processing information obtaining means 104, generates a variable definition statement for reserving the calculation results of each item of all the output tables belonging to the processing type "insert", in a generation program, and passes it to the automatic program combining means 109 (1706). Further, the output processing statement generating means 107 processes the information received from the output item processing information obtaining means 104, generates an output processing statement consisting of a processing condition statement, an item calculation statement, and an insert statement, as for an output table belonging to the processing type "insert", of all the output tables within the generation program, generates an output processing statement consisting of a processing condition statement and an update statement as for an output table belonging to the processing type "update", generates an output processing statement consisting of a processing condition statement, an item calculation statement, and a delete statement as for an output table belonging to the processing type "delete", and passes the respective data to the automatic program combining means 109 (1707).

In FIG. 1, the program skeleton 108 is to be formed by the portion unchangeable even if any business requirement is given as specifications, in the generation program, that is defined as a framework of a program. In this framework of the program, the program name, the cursor definition statement, the work variable definition statement, the output processing statement, and further inserting position of a piece of a program and the more depending on the necessity, are embedded, and a piece of the program generated from the business requirements given by the specifications are inserted into these inserting positions, thereby obtaining a completed program.

The automatic program combining means 109 inserts the program name obtained by the program skeleton customize information obtaining means 102 into the inserting position corresponding to the program name, of the inserting positions of the program skeleton 108; inserts the cursor definition statement generated by the cursor definition statement generating means 105 into the inserting position corresponding to the cursor definition statement; inserts the work variable definition statement generated by the work variable definition statement generating means 106 into the inserting position corresponding to the work variable definition statement; inserts the output processing statement generated by the output processing statement generating means 107 into the inserting position corresponding to the output processing statement; and inserts a piece of the corresponding program statement obtained by the program skeleton customize information obtaining means 102 into the other inserting position, thereby combining a program automatically (1708).

The detailed description of the first form of the embodiment according to the present invention will be made with reference to FIGS. 1 to 5, this time.

FIG. 2A is a view showing the constitutional example of the specifications 1 of FIG. 1. The reference numeral 201 shows the whole specification, and corresponds to the specifications 1 of FIG. 1. As illustrated in FIG. 2A, the specifications 201 consists of ten elements: (1) the program name 202 that is the name of a program to be generated from the specifications, (2) the input table item definition 203 including the information on the name of an input table, and the type and the name of each item, (3) the select item definition 204 including the name of an item to be defined within the select statement, for actual use in the processing specified by this specification, of the input table items, (4) the output table item definition 205 including the information concerning the name of an output table, the type and the name of each item, (5) the output table processing definition 206 including the processing condition indicating the condition for processing each output table, (6) the processing type indicating "insert", "update", and/or "delete", (7) the update/delete condition indicating the condition for updating/deleting when the processing type is "update" and "delete", (8) the output table processing definition 206 for calculating the value of each item when the processing type is "insert" and "update", (9) the select condition definition 207 including the condition when obtaining the data from the input table, and (10) the program customize information 208 including the other information necessary for customizing the program skeleton.

The information for every type of the processing necessary for the output table processing definition 206 is shown in a list of FIG. 2B. With reference to FIG. 2B, when the processing type is "ginsert", the processing expression is requisite, the processing condition is arbitrary, and the update/delete conditions are unnecessary. When the processing type is "update", the processing expression and the update condition are requisite, and the processing condition is arbitrary. When the processing type is "delete", the delete condition is requisite, the processing condition is arbitrary, and the processing expression is unnecessary. When the processing condition is not specified, the processing will be performed on the assumption that the processing condition is always satisfied. The specification input means 101 of FIG. 1 inputs the specifications having the structure as shown in FIGS. 2A and 2B, and passes it to the program skeleton customize information obtaining means 102, the cursor definition information obtaining means 103, and the output item processing information obtaining means 104.

The program skeleton customize information obtaining means 102 takes out the portion corresponding to the program name 202 and the program customize information 208 of FIG. 2A, from the specifications information handed from the specifications input means 101, and passes it to the automatic program combining means 109. The cursor definition information obtaining means 103 takes out the portion corresponding to the input table item definition 203, the select item definition 204, and the select condition definition 207 of FIG. 2A, from the specifications information handed from the specifications input means 101, and passes it to the cursor definition statement generating means 105. The output item processing information obtaining means 104 takes out the portion corresponding to the output table item definition 205, and the output table processing definition 206 of FIG. 2A, from the specifications information handed from the specifications input means 101, and passes it to the work variable definition statement generating means 106 and the output processing statement generating means 107.

Figure 3:
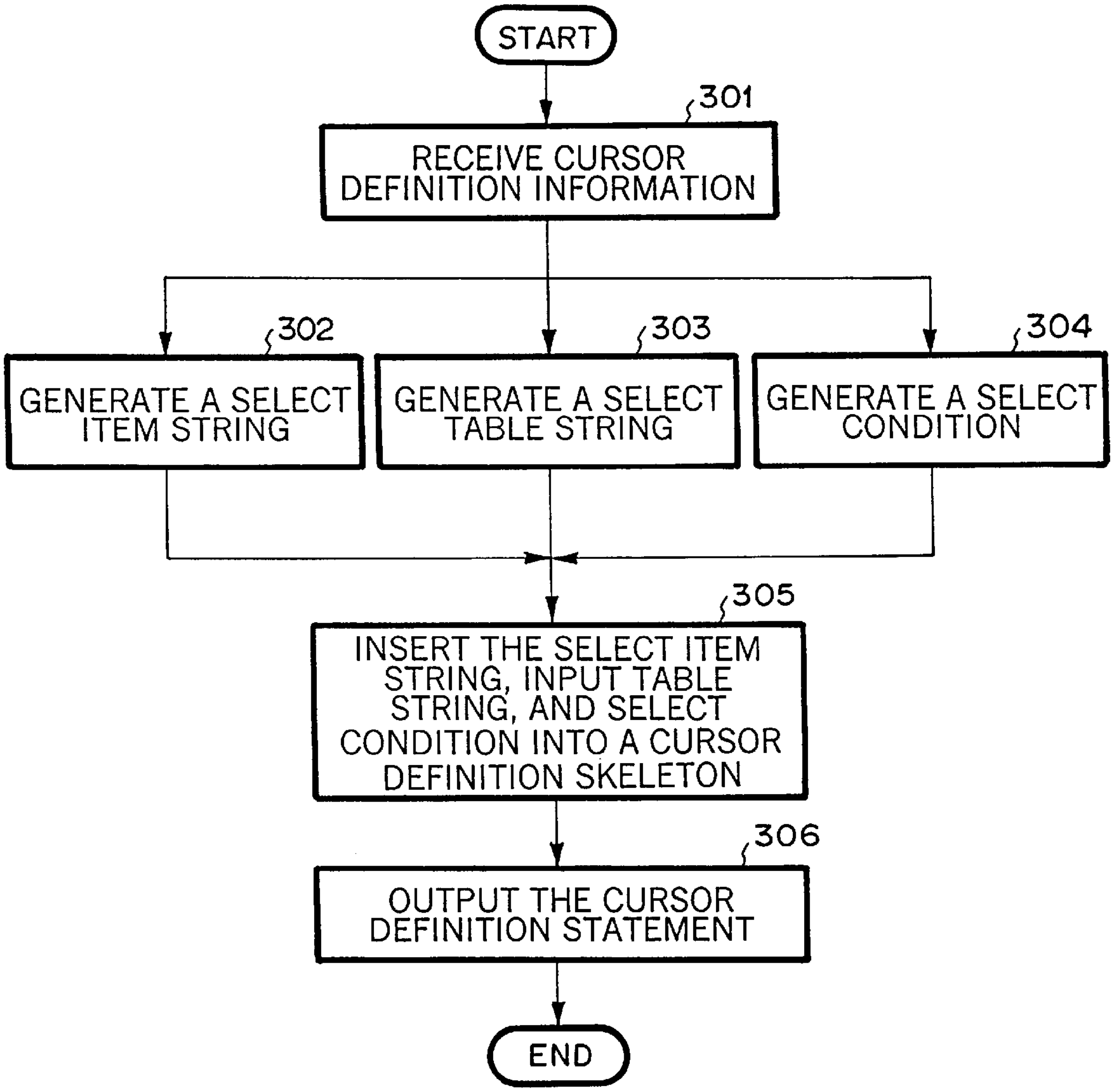
FIG. 3 is a flow chart showing the processing of the cursor definition statement generating means in the first form of the embodiment.

This time, the operation of the cursor definition statement generating means 105 will be described by using FIG. 3. FIG. 3 is a flow chart showing the operation of the cursor definition statement generating means 105. The cursor definition statement generating means 105 of FIG. 1 receives the input table item definition information, the select item definition information, and the select condition definition information from the cursor definition information obtaining means 103 as the cursor definition information, in 301 of FIG. 3. In 302, only the item name specified within the select item definition information is extracted, out of the input table item definition information, and the select item string is generated in the form according to the syntax of the programming language to be generated. In 303, only the name of the input table used for the select item definition information is extracted, out of the input tables specified within the input table item definition information, and the select table string is generated in the form according to the syntax of the programming language to be generated. In 304, the select condition definition information is processed in the form according to the syntax of the programming language to be generated, and the select condition statement is generated. In 305, the select item string, the select table string, and the select condition respectively generated in 302, 303, and 304 are inserted into each corresponding inserting position of the cursor definition skeleton, and the cursor definition statement is generated. In 306, the cursor definition statement is output and passed to the automatic program combining means 109 of FIG. 1.

Figure 7:
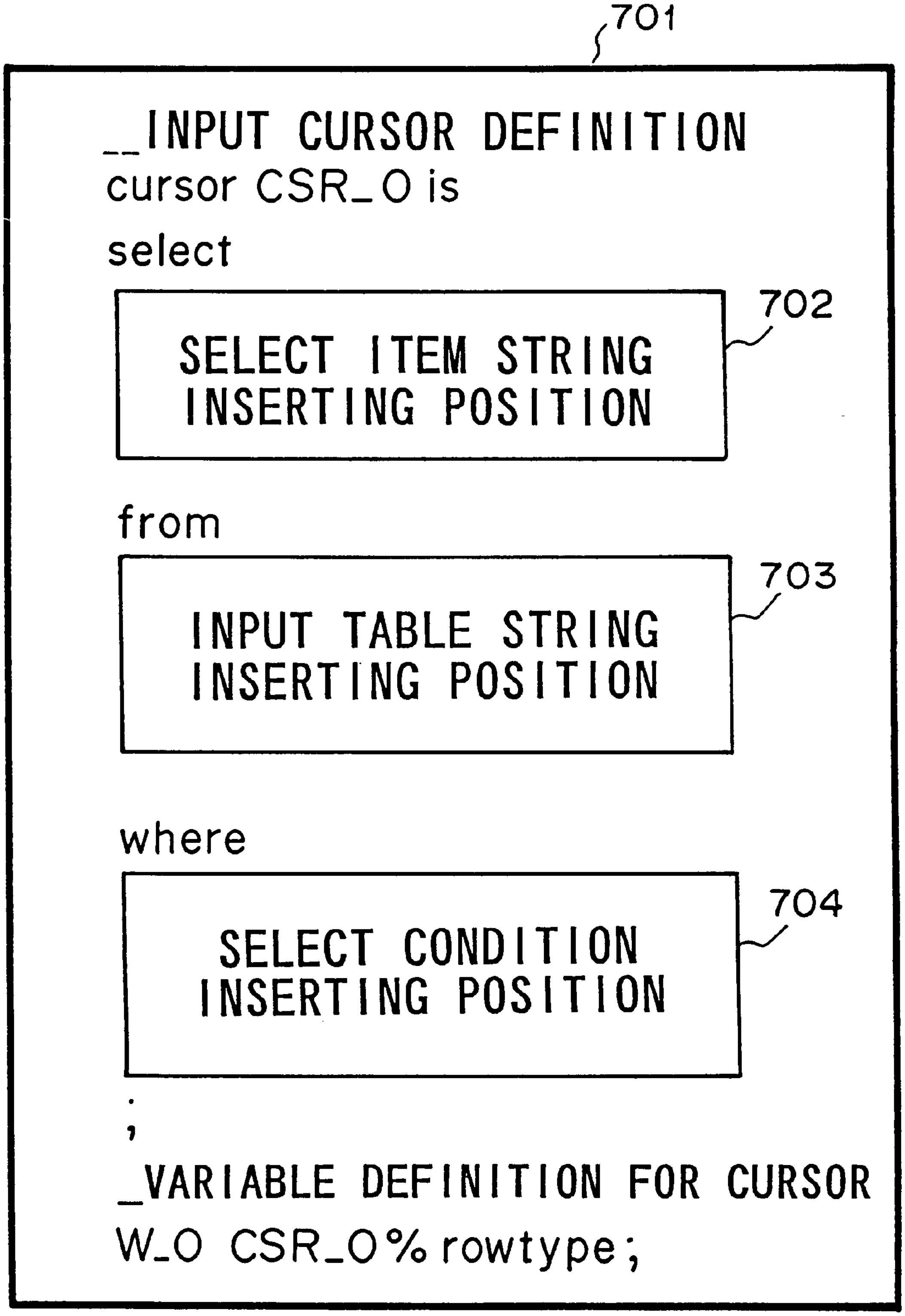
FIG. 7 is a view showing the structure of a cursor definition statement skeleton used in the cursor definition statement generating means in the first form of the embodiment.

FIG. 7 shows the constitutional example of the cursor definition skeleton. With reference to FIG. 7, the cursor definition statement skeleton 701 is a skeleton depending on a specific programming language, and formed by the select item string inserting position 702, the input table string inserting position 703, and the select condition inserting position 704. The select item string, the input table string, and the select condition, which have been generated by the cursor definition statement generating means of FIG. 1, are respectively inserted into these empty portions, thereby to form the cursor definition statement.

Figure 4:
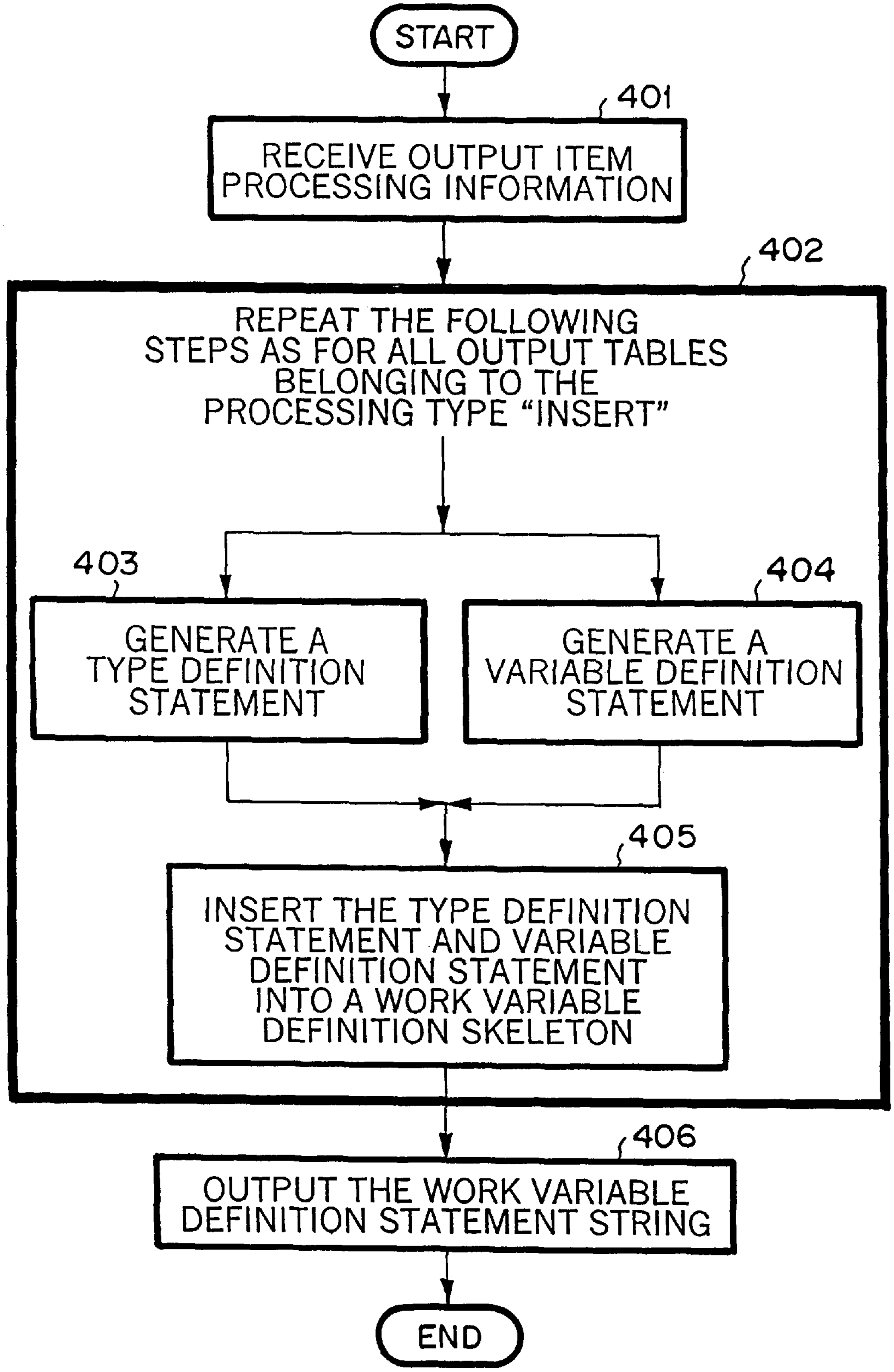
FIG. 4 is a flow chart showing the processing of the work variable definition statement generating means in the first form of the embodiment according to the present invention.

Next, the operation of the work variable definition statement generating means 106 will be described by using FIG. 4. FIG. 4 is a flow chart showing the operation of the work variable definition statement generating means 106. The work variable definition statement generating means 106 of FIG. 1 receives the output table item definition information from the output item processing information obtaining means 104 in 401 of FIG. 4. Generally, it is possible to specify one or more output tables; however, as for the output table belonging to the processing type "update" or "delete", the work variable definition is not necessary, and as for the output table belonging to the processing type "insert", 402 will be repeated. In 402, Step 403 to Step 405 are executed. In 403, the type definition statement for defining the record type of an output table is generated. In 404, the statement for defining the work area variable according to the type defined in 403 is generated. In 405, the type definition statement generated in 403 and the variable definition statement generated in 404 are inserted into the respective corresponding inserting positions of the work variable definition skeleton. In Step 406, the work variable definition statement string completed by the repetition of 402 is output and passed to the automatic program combining means 109 of FIG. 1.

Figure 8:
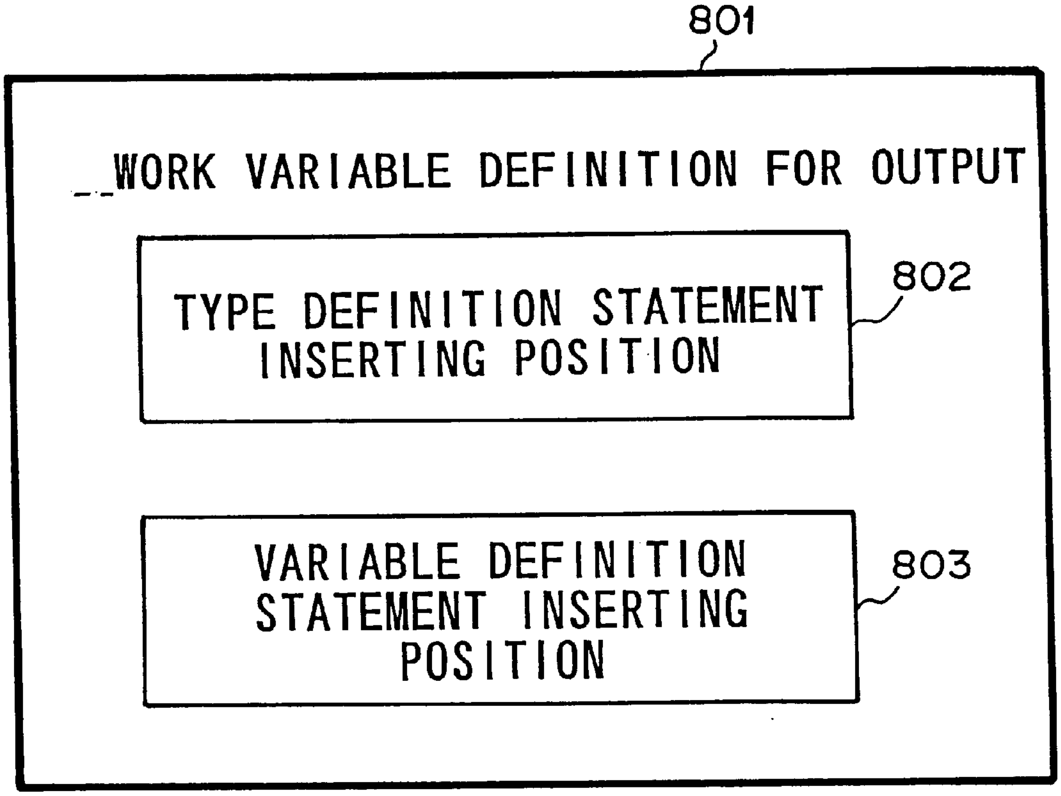
FIG. 8 is a view showing the structure of the work variable definition statement skeleton used in the output processing statement generating means in the first form of the embodiment according to the present invention.

FIG. 8 shows the constitutional example of the work variable definition skeleton. With reference to FIG. 8, the work variable definition skeleton 801 is formed by the type definition statement inserting position 802 and the variable definition statement inserting position 803. In 405 of FIG. 4, the type definition statement and the variable definition statement are respectively inserted into these inserting positions, thereby completing the work variable definition statement. When there are a plurality of work variable definition statements, the plurality of the completed work variable definition statements are combined together into a work variable definition statement string.

Figure 5:
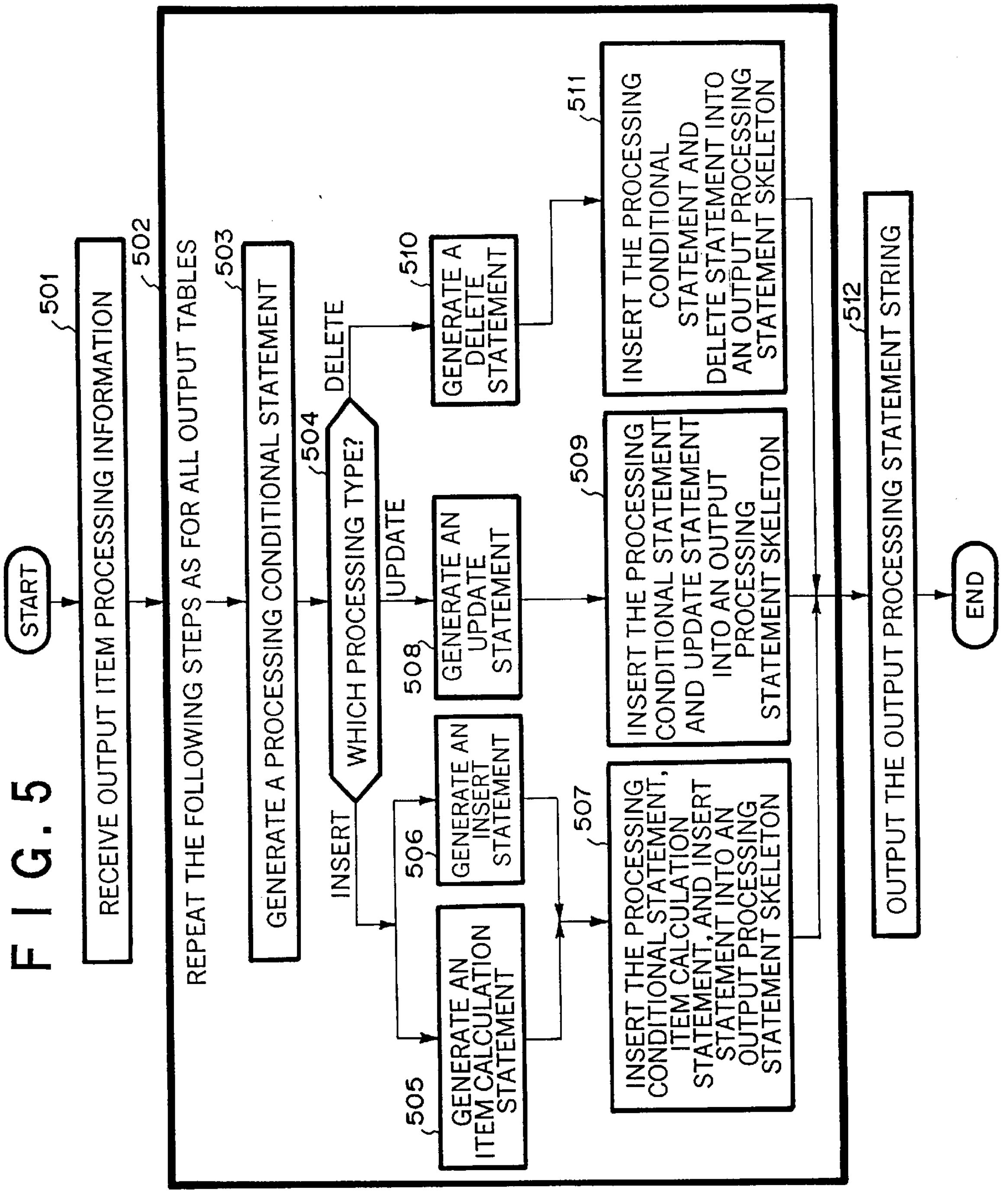
FIG. 5 is a flow chart showing the processing of the output processing statement generating means in the first form of the embodiment according to the present invention.

This time, the operation of the output processing statement generating means 107 will be described by using FIG. 5. FIG. 5 is a flow chart showing the operation of the output processing statement generating means 107. The output processing statement generating means 107 of FIG. 1 receives the output table item definition information and the output table processing definition information from the output item processing information obtaining means 104 in 501 of FIG. 5. Since it is possible to specify one or more output tables, 502 will be repeated as for all the output tables. In 503, the processing condition statement is generated from the processing condition information, of the output table processing definition information received in 501. In 504, the processing type information is examined, of the output table processing definition information received in 501, and the following processing branches depending on the value. When the processing type information is "insert", the operation is performed from Step 505 to Step 507; when the processing type information is "update", the operation is performed from Step 508 to Step 509; and when the processing type information is "delete", the operation is performed from Step 510 to Step 511.

In 505, the processing expression of each item is processed, of the output table processing definition information, and the item calculation statement is generated. In 506, the output table item definition information is processed and the inserting statement is generated. In 507, the processing condition statement generated in 503, the item calculation statement generated in 505, the insert statement generated in 506 are inserted into the respective corresponding inserting positions of the output processing skeleton, thereby completing the output processing statement.

In 508, the processing expression of each item, of the output table processing definition information, and the output table item definition information are processed, thereby generating an update statement. In 509, the processing condition statement generated in 503 and the update statement generated in 508 are inserted into the respective corresponding inserting positions of the output processing statement skeleton, thereby completing an output processing statement.

In 510, the output table item definition information is processed, thereby generating a delete statement. In 511, the processing condition statement generated in 503 and the delete statement generated in 510 are inserted into the respective corresponding inserting positions of the output processing statement skeleton, thereby completing the output processing statement. When the output type is "update" and "delete", nothing is inserted into the item calculation statement inserting position of the output processing statement skeleton.

In 512, all the output processing statement string completed by the repetition of 502 are output and passed to the automatic program generating means 109.

Figures 9A, 9B, 9C, 9D:
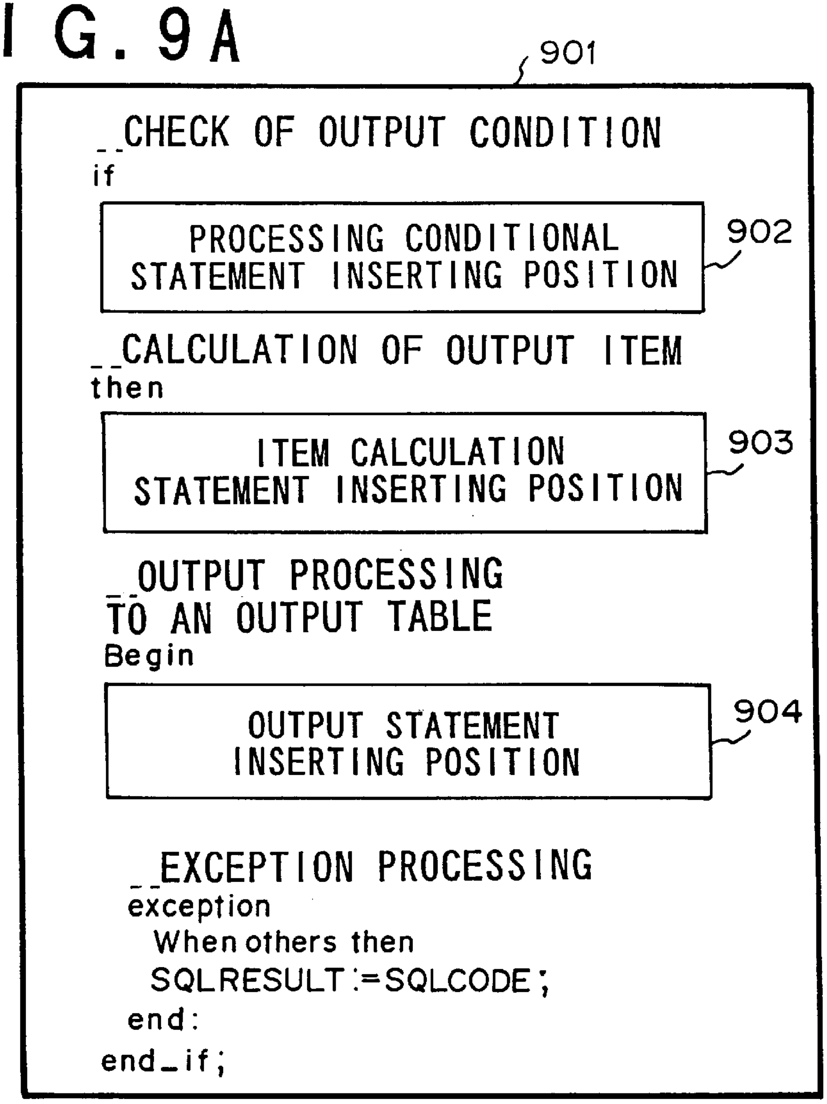
FIGS. 9A to 9D are views showing the structure of the output processing statement skeleton used in the output processing statement generating means in the first form of the embodiment according to the present invention, and the structure of an insert statement, an update statement, and a delete statement of the skeleton.

FIG. 9A shows the constitutional example of the output processing statement skeleton. With reference to FIG. 9A, the output processing statement skeleton 901 is formed by the processing condition statement inserting position 902, the item calculation statement string inserting position 903, and the output statement inserting position 904. In 507, 509, and 511 of FIG. 5, the processing condition statement, the item calculation statement, and the insert statement/update statement/delete statement are respectively inserted into these inserting positions, thereby completing the output processing statement. With reference to FIG. 9A, only when the processing condition inserted into the processing condition statement inserting position 902 is a condition clause of if statement and this condition is satisfied, it is found that the calculation processing of the output item inserted into the item calculation statement inserting position 903 as well as the output processing toward the output table inserted into the output statement inserting position 904 are performed.

Each example of templates for the insert statement, the update statement, and the delete statement in the PL/SQL language, which are to be inserted in the output statement inserting position 904 of FIG. 9A, is shown in FIGS. 9B to 9D. With reference to FIG. 9B, when the processing type is "insert", the name of the output table is taken out from the output table item definition information and assigned to <<output table name>>. The name of an item is taken out, jointed by "," to generate a list of item names, and assigned to <<item name list>>. Then, the name of an item is taken out. Further, the variable name is generated in a predetermined way, jointed by "," to generate a list of the variable names, and assigned to <<variable name list>>; thereby generating an insert statement.

With reference to FIG. 9C, when the processing type is "update", the name of an output table is taken out from the output table item definition information, and assigned to <<output table name>>. The processing expression is taken out from the output table processing definition information, jointed by "," to generate a list of update statements, and assigned to <<update statement list>>. An update condition is taken out from the output table processing definition information and assigned to <<update condition>>, thereby generating an update statement.

With reference to FIG. 9D, when the processing type is "delete", the name of an output table is taken out from the output table item definition information, and assigned to <<output table name>>; and the delete condition is taken out from the output table processing definition information and assigned to <<delete condition>>, thereby generating a delete statement.

Next, the operation of the automatic program combining means 109 of FIG. 1 will be described by using FIG. 10 and FIG. 6. FIG. 10 is a view showing the constitutional example of a program skeleton. The program skeleton is formed by dividing the program described in a specified programming language into the portion changeable according to specifications and the portion unchangeable according to specifications. Here, the portion unchangeable according to specifications is kept as the program statement, and the portion changeable according to specifications has the inserting position of a piece of the program generated from the specifications. In the example of FIG. 10, as the inserting position of a piece of the program, there are the program name inserting position 1002, the cursor definition statement inserting position 1003, the work variable definition statement string inserting position 1004, the "initial processing" inserting position 1005, the output processing statement string inserting position 1006, and the "end processing" inserting position 1007.

Figure 6:
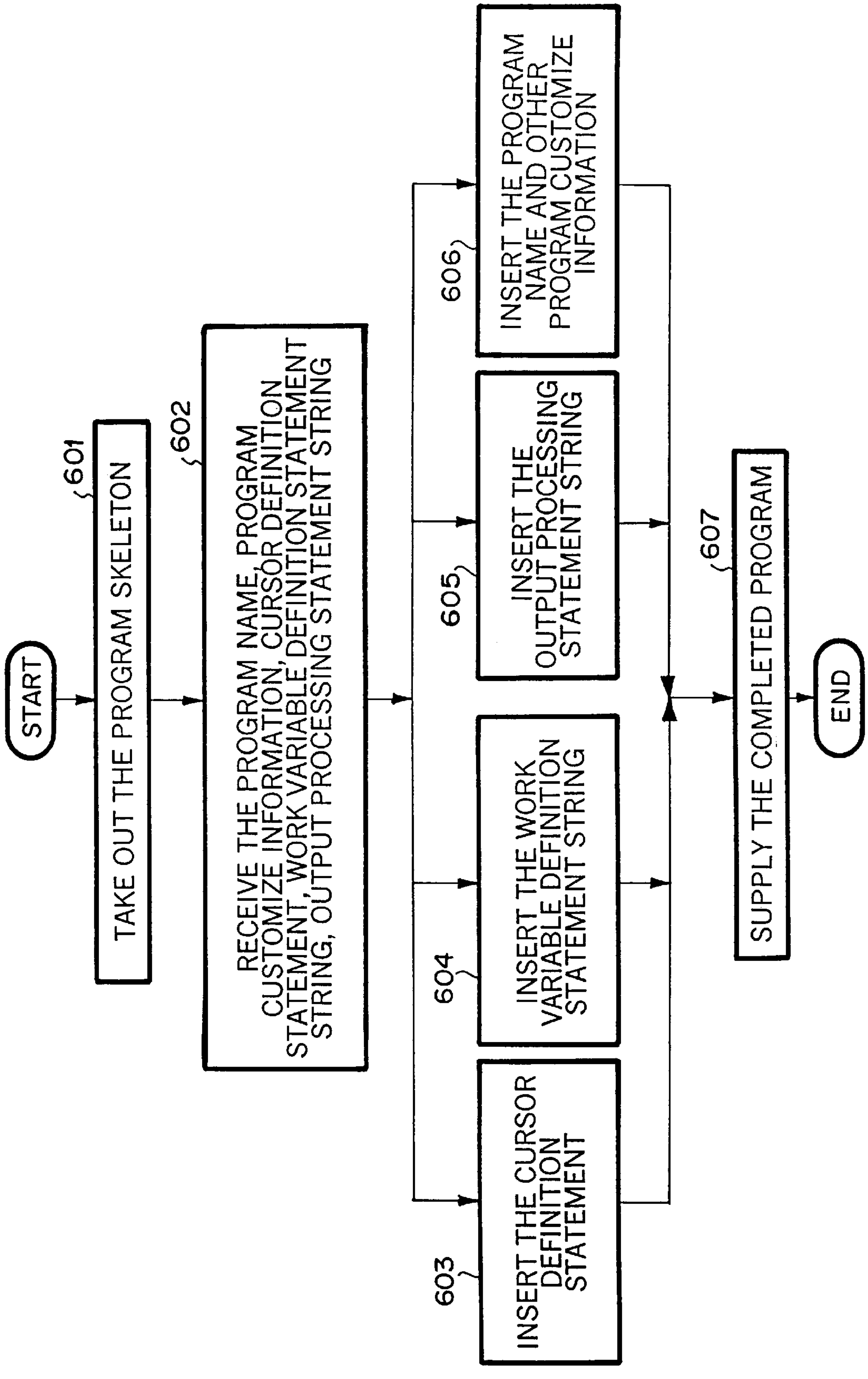
FIG. 6 is a flow chart showing the processing of the automatic program combining means in the first form of the embodiment according to the present invention.

FIG. 6 is a flow chart showing the operation of the automatic program combining means 109. The automatic program combining means 109 is to complete a program by inserting a piece of the program generated from specifications in the inserting position of a piece of the program, in the program skeleton 108. With reference to FIG. 6, in Step 601, the program skeleton 108 of FIG. 1 is taken out at first. In 602, the program customize information, the cursor definition statement, the work variable definition statement string, and the output processing statement string are respectively received from the program skeleton customize information obtaining means 102, the cursor definition statement generating means 105, the work variable definition statement generating means 106, and the output processing statement generating means 107 of FIG. 1. The cursor definition statement received in 602 is inserted into the cursor definition statement inserting position of the program skeleton, in Step 603. In 604, the work variable definition statement string received in 602 is inserted into the work variable definition statement string inserting position of the program skeleton. In 605, the output processing statement string received in 602 is inserted into the output processing statement string inserting position of the program skeleton. In 606, the program name received in 602 is inserted into the program name inserting position of the program skeleton, and the program skeleton customize information is inserted into the inserting position corresponding to the same name. In the program skeleton of FIG. 10, "initial processing" and "end processing" correspond to this processing. Where, as far as the description of specifications corresponds to the program skeleton, it is possible to provide several inserting positions. In 607, all the pieces of the whole program are inserted, and the completed program is output.

As mentioned above, a program can be automatically generated from specifications and output.

Although the cursor definition skeleton, the work variable definition skeleton, the output processing statement skeleton, and the program skeleton are written and explained in accordance with the PL/SQL language in this description, it is possible to generate a program in another programming language by preparing a skeleton in accordance with the programming language to be generated, in automatic generation of a program of another programming language.

In the flow charts of the processing of FIG. 3, FIG. 4, FIG. 5, and FIG. 6, the portions described in parallel indicate that the operations therebetween may be processed in any processing order. For example, in 302, 303, and 304 of FIG. 3, the operations may be processed in this order, or the operations may be processed in the order of 304, 303, and 302, or the operations in their combination may be processed at once.

Thus, in the form of the embodiment, it is possible for a program developer to generate a data processing program automatically, only by specifying the program name, the input table item definition, the select item definition, the output table item definition, the output table item calculation processing definition, the select condition definition, and the program customize information as specifications. Therefore, it can remove such a mistake that would mix in programming process in the conventional way, and further improve the productivity of the program development extremely.

Second Form of Embodiment

This time, a second form of the embodiment according to the present invention will be described, especially about the difference between the first form of the embodiment and itself.

In the first form of the embodiment, the specifications 201 of FIG. 2A consists of the program name 202, the input table item definition 203, the select item definition 204, the output table item definition 205, the output table item calculation processing 206, the select condition 207, and the program customize information 208. In the second form of the embodiment, the specifications are formed by the above elements excluding the select item definition 204. Namely, as illustrated in FIG. 11, the specifications consists of the program name 1102, the input table item definition 1103, the output table item definition 1104, the output table processing definition 1105, the select condition definition 1106, and the program customize information 1107.

Figure 11:
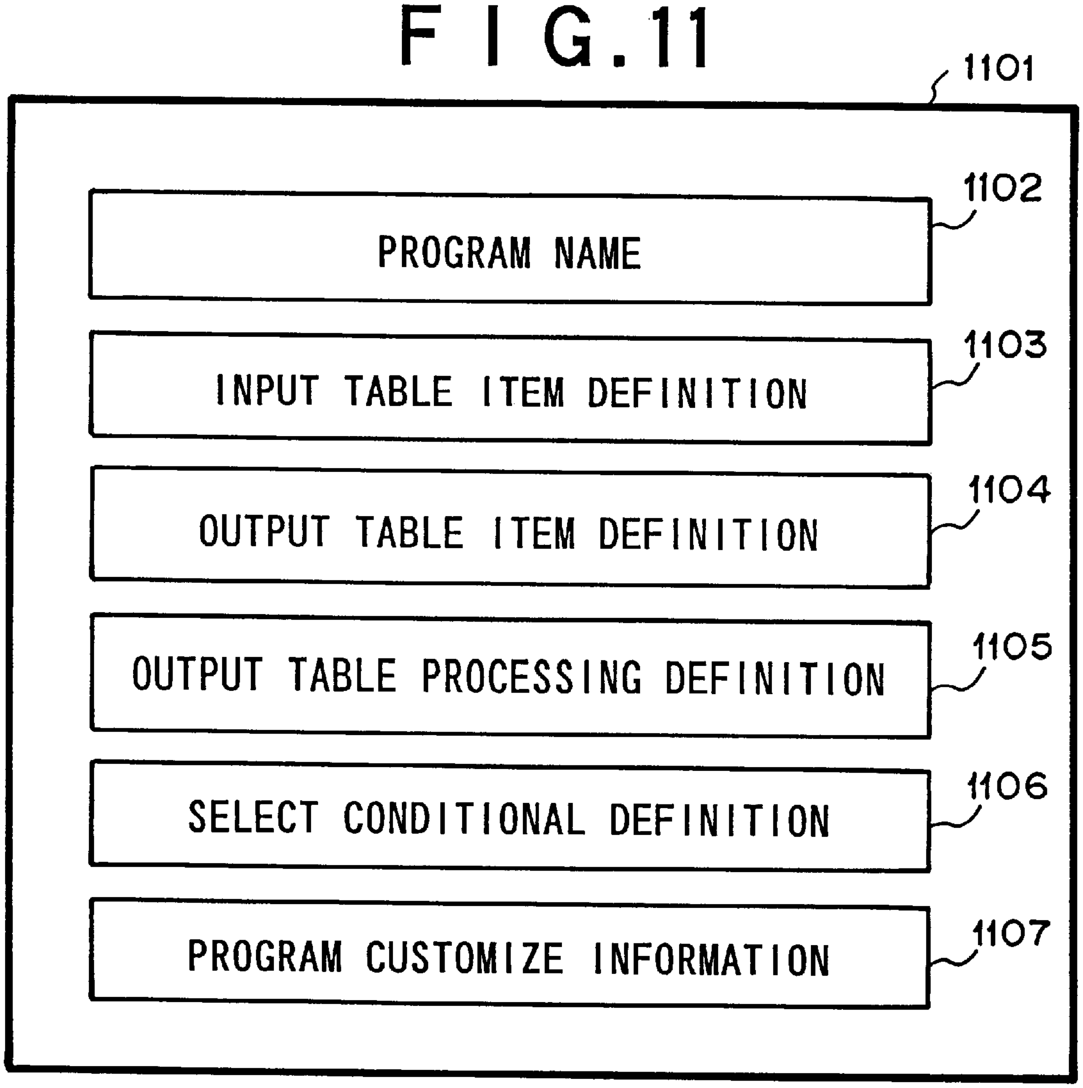
FIG. 11 is a view showing the structure of the specifications in the second form of the embodiment according to the present invention.

In the second form of the embodiment, the specifications input means 101 of FIG. 1 inputs the specifications having such a structure as shown in FIG. 11, and passes the same to the program skeleton customize information obtaining means 102, the cursor definition information obtaining means 103, and the output item processing information obtaining means 104. The cursor definition information obtaining means 103 of FIG. 1 in the second form of the embodiment takes out the portion corresponding to the input table item definition 1103, the output table processing definition 1105, and the select condition definition 1106, from the specifications information handed from the specifications input means 101, and passes the same to the cursor definition statement generating means 105.

Figure 12:
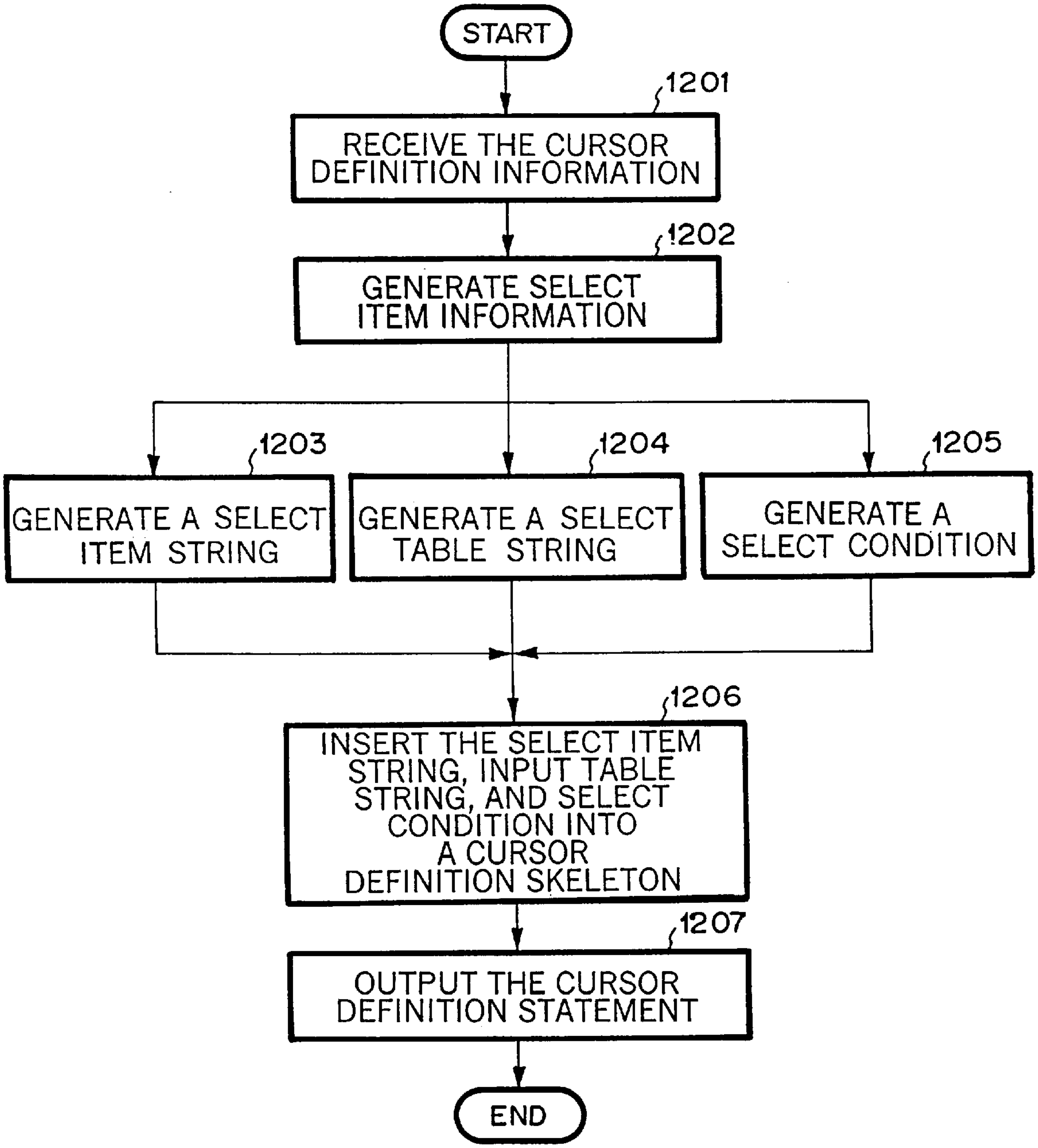
FIG. 12 is a flow chart showing the processing of the cursor definition statement generating means in the second form of the embodiment according to the present invention.
Figure 13:
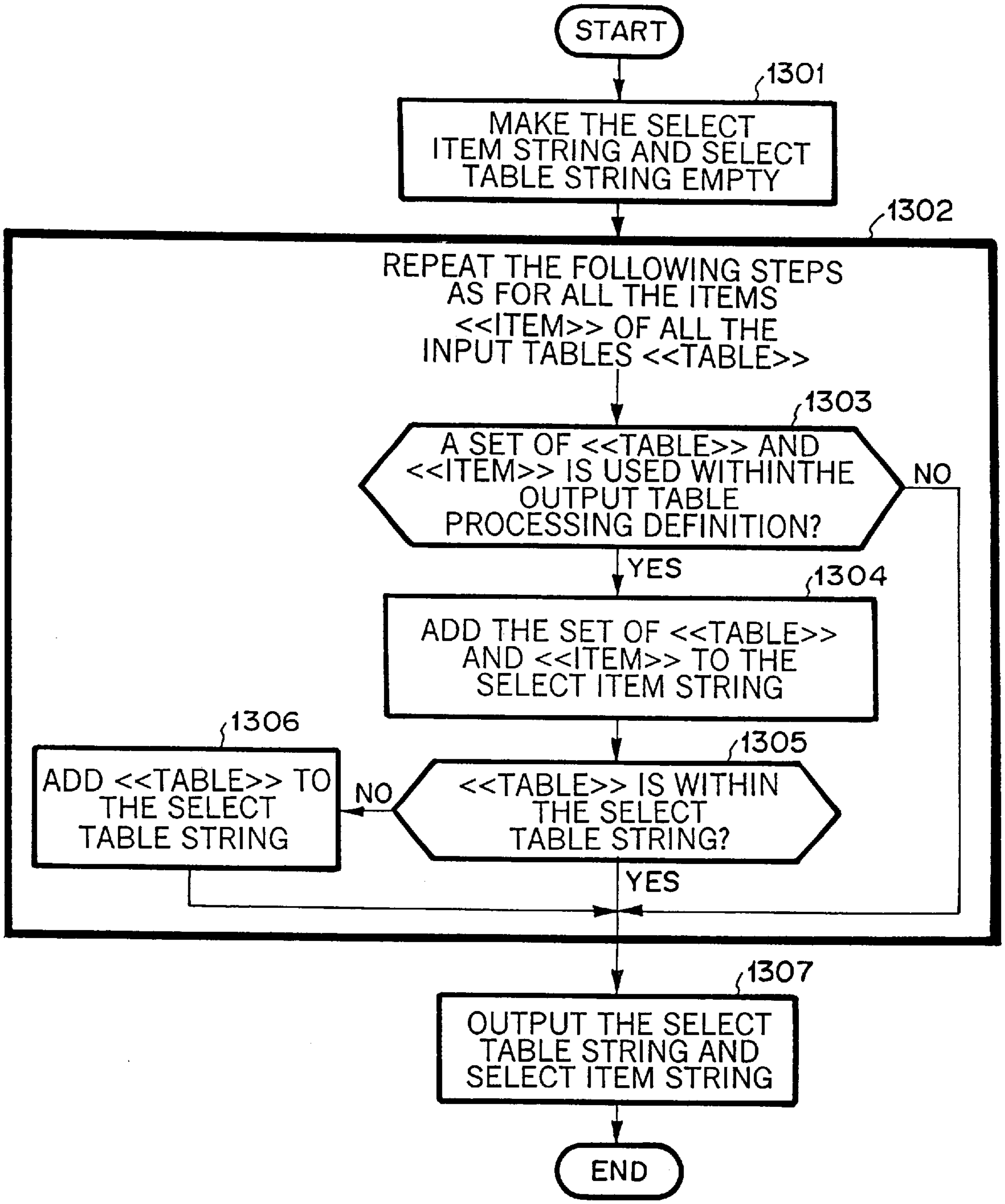
FIG. 13 is a flow chart showing the processing of generating the select item definition information in the second form of the embodiment according to the present invention.

The detailed processing of the cursor definition statement generating means 105 in the second form of the embodiment is shown in FIG. 12, this time. In 1201 of FIG. 12, the input table item definition information, the select condition definition information, and the output table processing definition information are received from the cursor definition information obtaining means 103 as the cursor definition information. In 1202, the select item definition information is generated from the input table item definition information and the output table processing definition information, as shown in FIG. 13. The operation, hereinafter, will be performed in the same way as that of the cursor definition statement generating means 105 in the first form of the embodiment shown in FIG. 3.

With reference to FIG. 13, the select table string and the select item string are made empty in 1301 at first. In 1302,

1303 to 1306 will be repeated as for all the items <<item>> of all the input tables <<table>>. In 1303, it is tested whether a set of <<table>> and <<item>>, namely, the item of the input table that is noted is used or not in the processing condition or the processing expression or the update/delete condition within the output table processing definition. When it is not used, the operation will move to the next repetition element. When it is used, a set of <<table>> and <<item>> is added to the select item string in 1304. In 1305, whether <<table>> exists within the select table string is tested. When it exists there, the operation will move to the next repetition element. When there exists none, <<table>> is added to the select table string in 1306. After repeating the above operation as for all the items of all the input tables, the select table string is combined with the select item string, which is output as the select item definition information in 1307.

As mentioned above, the select item definition information in the first form of the embodiment according to the present invention can be automatically generated. Therefore, in the process of 1203 to 1207 of FIG. 12, the cursor definition statement can be generated in the same operation as that of FIG. 3 in the first form of the embodiment.

The operations of the other components are the same as those of the first form of the embodiment.

In this form of the embodiment, a user can automatically generate the same program as that of the first form of the embodiment, without specifying the select item information within specifications; therefore, it is effective in generating specifications easier compared with the first form of the embodiment.

Third Form of Embodiment

This time, a third form of the embodiment according to the present invention will be described especially about the difference between the first form of the embodiment and itself.

Figure 14:
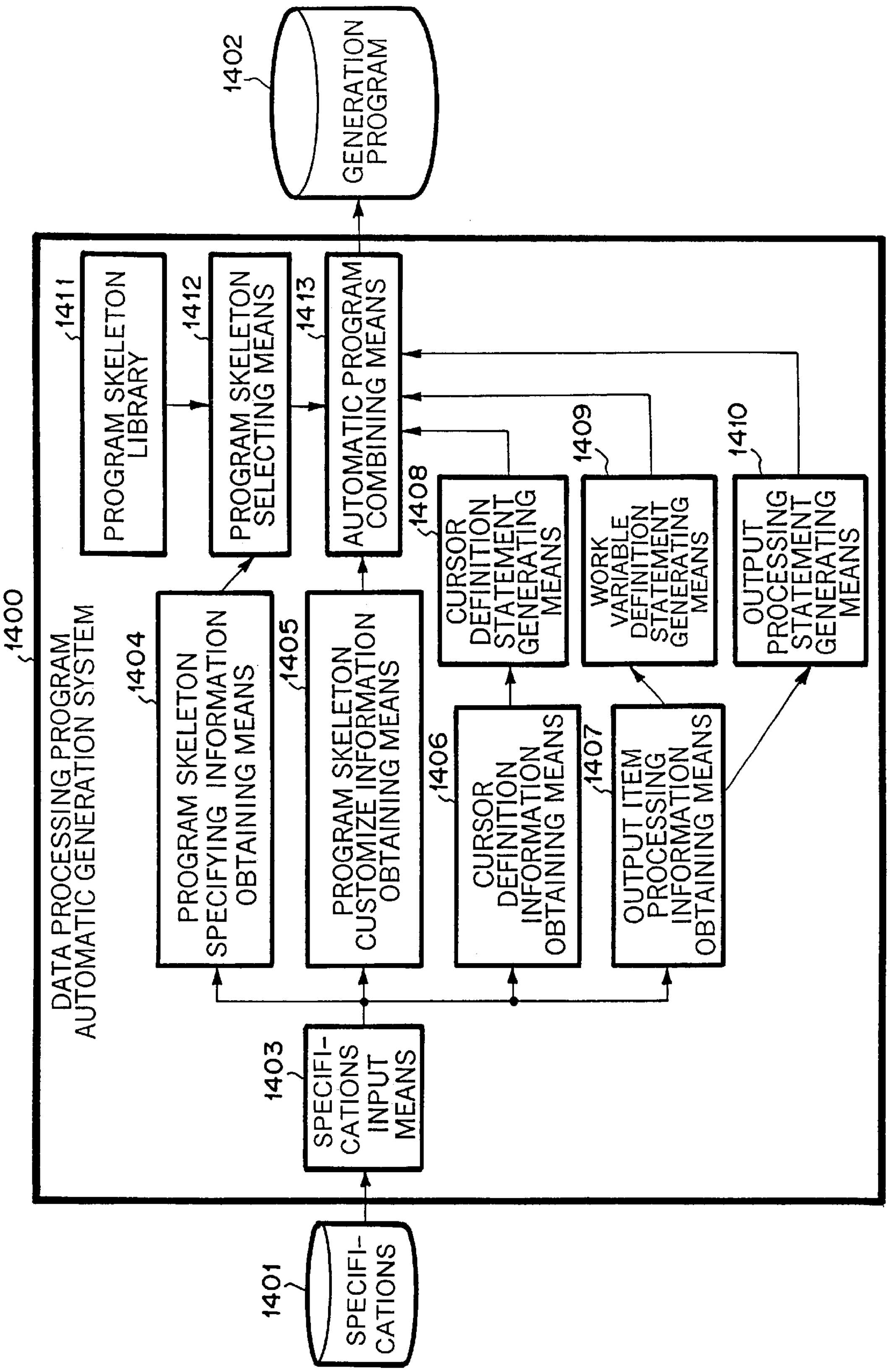
FIG. 14 is a block diagram showing the structure of the third form of the embodiment according to the present invention.

FIG. 14 shows the structure of the third form of the embodiment according to the present invention. By comparing FIG. 1 with FIG. 14, it is provided with a program skeleton library 1411 capable of holding any kind and any number of program skeletons, instead of the program skeleton 108 of FIG. 1 including one program skeleton, and additionally provided with a program skeleton specifying information obtaining means 1404 and a program skeleton selecting means 1412.

Figure 15:
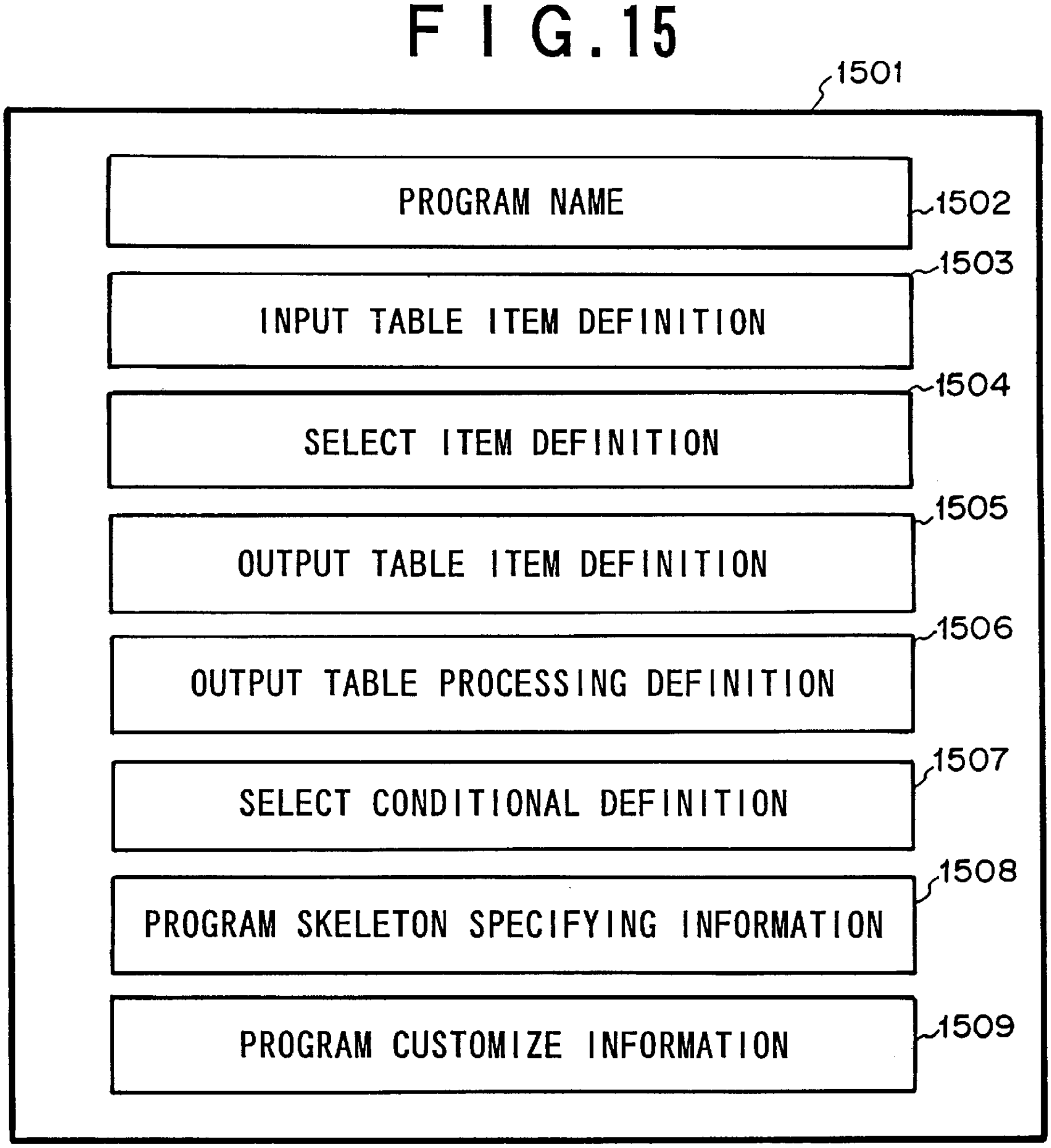
FIG. 15 is a view showing the structure of the specifications in the third form of the embodiment according to the present invention.

The specification 1401 is formed by adding the program skeleton specifying information compared with the specifications 1 of FIG. 1. The structure of this specification is shown in FIG. 15. With reference to FIG. 15, the specifications 1501 consists of the program name 1502, the input table item definition 1503, the select item definition 1504, the output table item definition 1505, the output table processing definition 1506, the select condition definition 1507, the program skeleton specifying information 1508, and the program customize information 1509.

The specification input means 1403 of FIG. 14 inputs specifications having the structure as shown in FIG. 15, and passes it to the program skeleton specifying information obtaining means 1404, the skeleton customize information obtaining means 1405, the cursor definition information obtaining means 1406, and the output item processing information obtaining means 1407. The program skeleton specifying information obtaining means 1404 of FIG. 14 takes out the program skeleton specifying information from the specifications input by the specifications input means 1403, and passes it to the program skeleton selecting means 1412. The program skeleton selecting means 1412 takes out the program skeleton specified by using the program skeleton specifying information from the program skeleton library 1411, and passes the program skeleton to the automatic program combining means 1413. When the program cannot be specified by using the program skeleton specifying information, that effect is notified to a user as the specifications error. The automatic program combining means 1413 inserts the program name and the program customize information received from the program skeleton customize information obtaining means 1405, the cursor definition statement received from the cursor definition statement generating means 1408, the work variable definition statement string received from the work variable definition statement generating means 1409, and the output processing statement string received from the output processing statement generating means 1410, into the inserting position of a piece of program in the program skeleton received from the program skeleton selecting means 1412, in the same way as that of the first embodiment form, thereby completing and outputting a program.

The operations of the other components are the same as those of the first form of the embodiment.

In this form of the embodiment, various data processing programs can be automatically generated by preparing a plurality of program skeletons with various forms of processing installed there. For example, it is possible to automatically generate a program written in a plurality of programming languages, a program based on different algorithms, and a program based on different methods of abnormal processing. Automatic generation of a program in a wider range can broaden the range of its application advantageously, compared with the first form of the embodiment.

Fourth Form of Embodiment

This time, a fourth form of the embodiment will be described, especially about the difference between the first form of the embodiment and itself.

Figure 16:
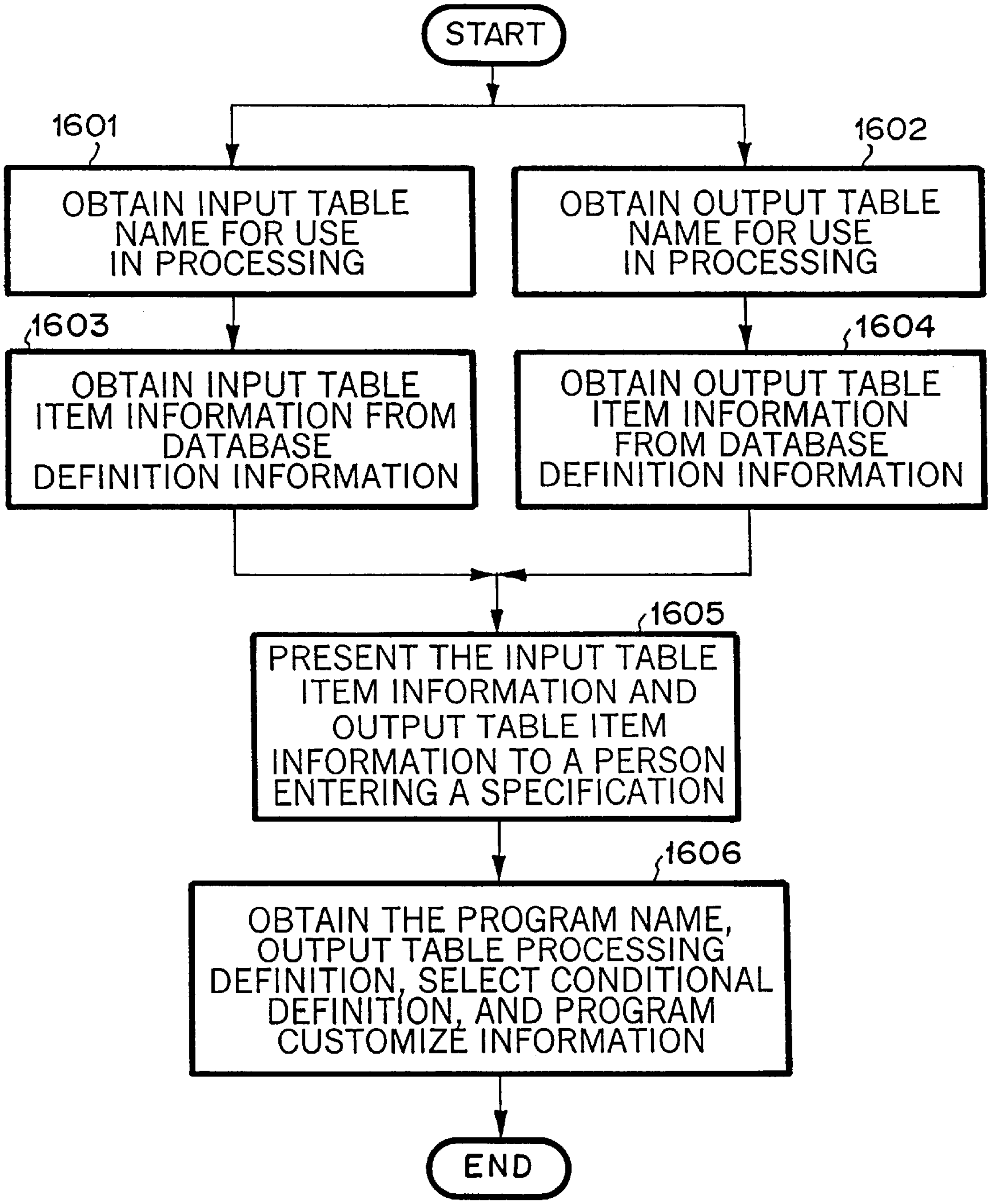
FIG. 16 is a flow chart showing the processing of the specifications input means in the fourth form of the embodiment according to the present invention.

This form of the embodiment is different from the first form of the embodiment in that specifications is input with reference to database definition information when the specifications input means 101 of FIG. 1 inputs the specifications. The database definition information is the definition information of a database to be processed by a data processing program to be generated automatically, which is stored in a storing unit not illustrated in FIG. 1 and which can be referred to by the specifications input means 101. FIG. 16 shows a flow chart of the processing by the specifications input means 101 of FIG. 1, according to the fourth form of the embodiment.

With reference to FIG. 16, the specifications input means 101 of FIG. 1 obtains only the names of an input table and an output table for use in the processing, in 1601 and 1602 at first. Next, in 1603 and 1604, the database definition information is retrieved respectively from the names of the input table and the output table, and the item definition information of the corresponding input table and output table is obtained. There are comments on the item name, the type, and the item, in the item definition information. In 1605, the item definition information of the input table and output table obtained in 1603 and 1604 is presented on a screen. In 1606, by letting a person entering the specifications use the item definition information of the input table and output table presented in 1605 on a screen, the program name, the select item definition, the output table processing definition, the select condition definition, and the program customize information are specified, and obtained. The input table item definition and the output table item definition are used, which the specifications input means 101 retrieved from the database definition information; therefore, it is not necessary for a user to generate them. When this form of the embodiment is applied to the second form of the embodiment, it is not necessary to generate the select item definition.

There are the following two methods (1) and (2), as a method for specifying and obtaining the program name, the select item definition, the output table processing definition, the select condition definition, and the program customize information by presenting the item definition information of the input table and output table to a person entering the specifications and by letting him or her use this, in 1605 and 1606 of FIG. 16.

(1) The names of an input table and an output table, and the type and the item name of each item are made in a line along one axis of a matrix, and the type and the name of each item of the output table, the program customize information, and the select condition definition are made in a line along another axis of the matrix. When referring to the information of each item of an input table, at the time of specifying the select item definition, the select condition definition, the program customize information, and the output table processing definition within specifications, symbols are attached to the corresponding cells of the matrix, thereby enabling reference to the value of the input item.

(2) When the names of an input table and an output table, the type and the item name of each item are displayed on a screen in the form of a list and a person entering the specifications specifies the select item definition, the select condition definition, the program customize information, and the output table processing definition, the corresponding item name and table name are expanded in a specified region as the character information by clicking the item name and the table name of a display region on a screen by a mouse, which enables input of the specifications, without entering the table name and the item name again.

In the specifications 1 of FIG. 1, the information of the input table item definition 203 and the output table item definition 205 of FIG. 2A is the same as that of the table definition of a database, which has been already generated when generating a database and stored within the database generally. In this form of the embodiment, not the input table item definition and the output table item definition are specified by a user again, but only the names of an input table and an output table are specified by a user as specifications of the processing. The input table item definition and the output table item definition are automatically retrieved from the information having been already stored within the database and obtained therefrom, thereby reducing a user's trouble of describing specifications and reducing a mistake in manual specification.

Fifth Form of Embodiment

This time, a fifth form of the embodiment will be described, especially about the difference between the first form of the embodiment and itself.

In this form of the embodiment, a debugging trace statement surrounded by, for example, a special symbol, for clearly discriminating its inserted position, is inserted in the program skeleton 108 of FIG. 1. The specification 1 includes generation program discriminating information indicating whether a debugging program is generated or an actual program is generated. The generation program discriminating information is input to the specifications input means 101 together with the other specification information and handed to the automatic program combining means 109. The automatic program combining means 109 decides whether the debugging trace statement in the program skeleton 108 is removed or left behind, according to the generation program discriminating information. More specifically, when generating an actual program, the debugging trace statement surrounded by a special symbol in the program skeleton 108 is removed together with the special symbol; when generating a debugging program, the debugging trace statement surrounded by a special symbol in the program skeleton 108 is left behind as it is. At this time, the special symbol may be removed, or if it is no problem, it may be left.

This form of the embodiment is effective in that debugging program generation and actual program generation can be switched by the generation program discriminating information in the specifications 1.

Sixth Form of Embodiment

Figure 18:
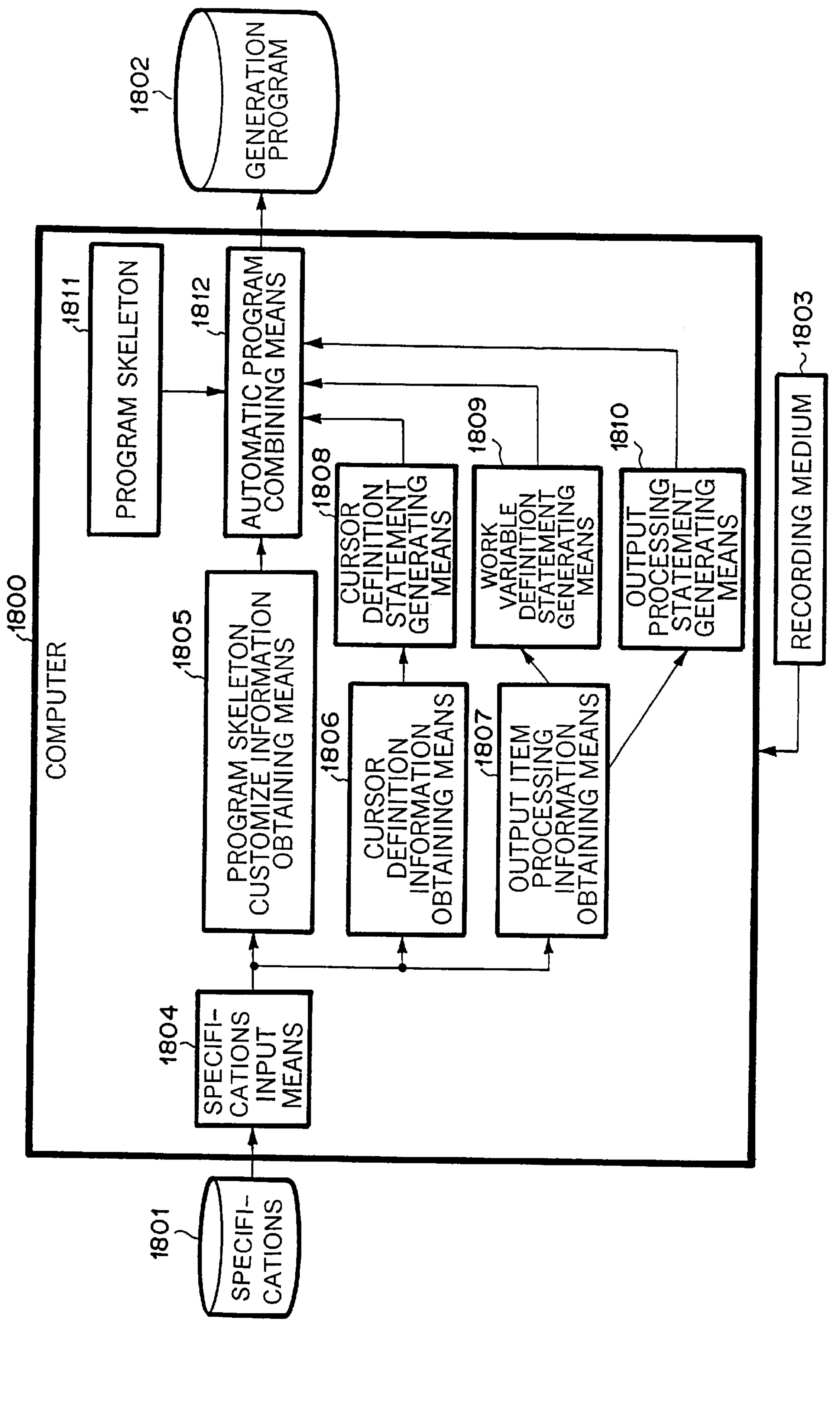
FIG. 18 is a block diagram showing the structure of the sixth form of the embodiment according to the present invention.
Figure 41:
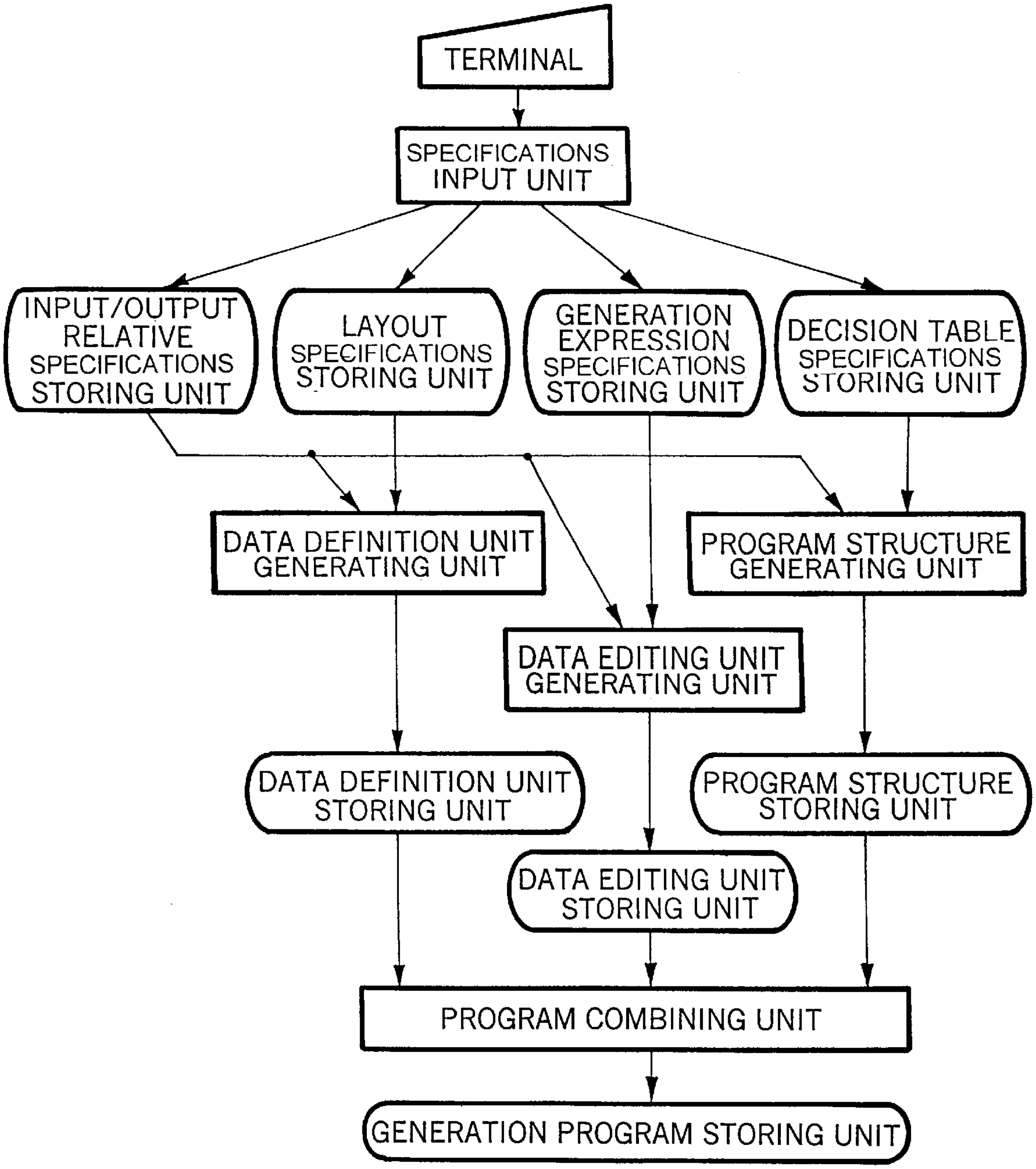
FIG. 41 is a view showing the structure of the first conventional technique.
Figure 42:
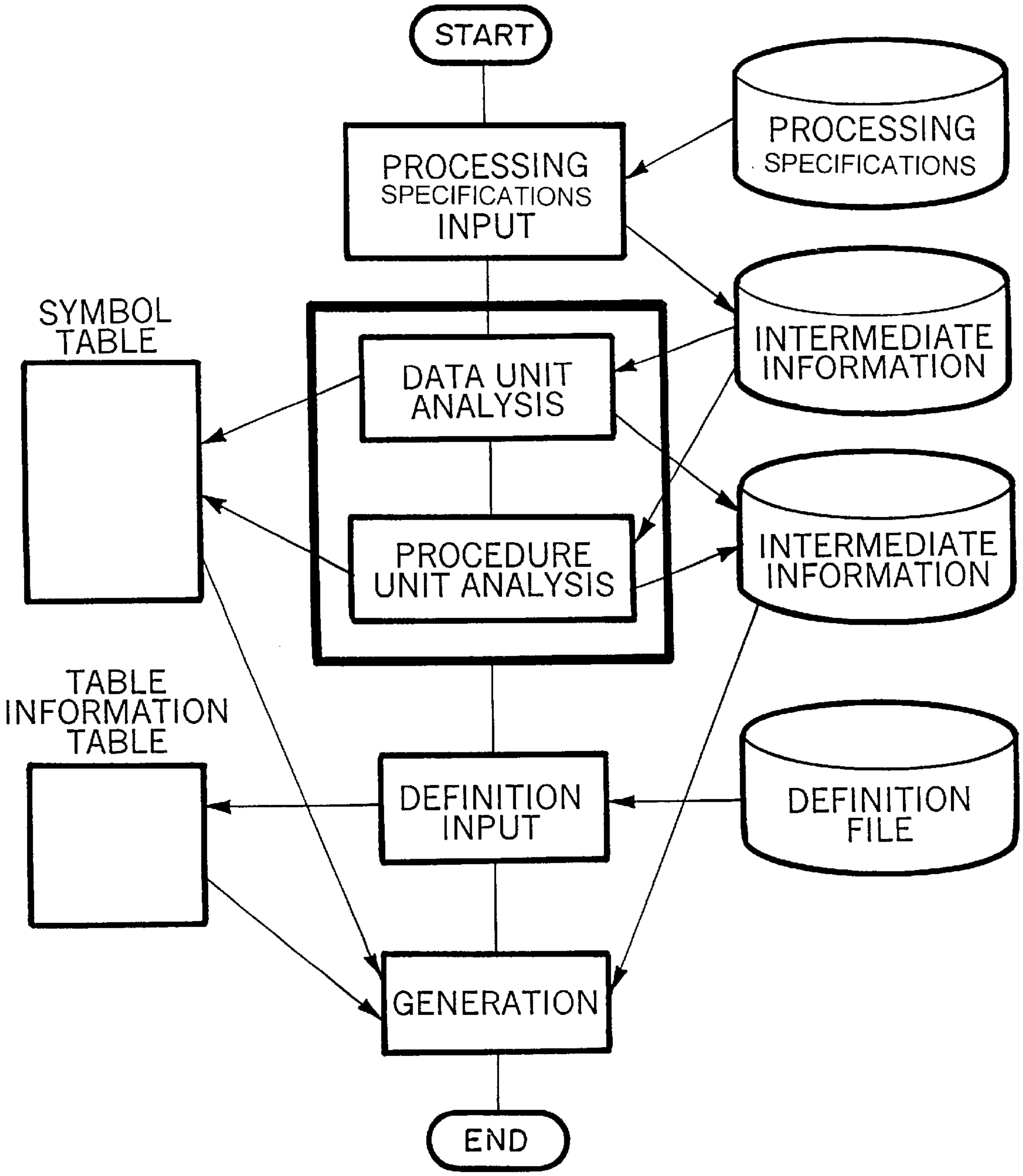
FIG. 42 is a view showing the structure of the second conventional technique.

Next, a sixth form of the embodiment of the present invention will be described by using FIG. 18. With reference to FIG. 18, the six form of the embodiment of the present invention is formed by a computer 1800 including a CPU, a main storage, and various input/output devices, and a recording medium 1803. The specification 1801 corresponds to the specifications 1 of FIG. 1, and the generation program 1802 corresponds to the generation program 2 of FIG. 1.

The computer program product, or recording medium 1803 is a magnetic disk, a semiconductor memory, CD-ROM, or the other recording medium readable by a machine, where a data processing program automatic generation program is recorded. The data processing program automatic generation program stored in the recording medium 1803 is read into the computer 1800 at the activation of the computer 1800, so as to control the operation of the computer 1800, thereby realizing specifications input means 1804, a program skeleton customize information obtaining means 1805, a cursor definition information obtaining means 1806, an output item processing information obtaining means 1807, a cursor definition statement generating means 1808, a work variable definition statement generating means 1809, an output processing generating means 1810, a program skeleton 1811, and an automatic program combining means 1812, on the computer 1800. These functional units serve the same function as the same named ones shown in FIG. 1.

Although the first form of the embodiment has been described in this description, the corresponding data processing program automatic combining program can be stored in the recording medium 1803 similarly, as for the second, third, fourth, and fifth forms of the embodiment.

EXAMPLE

An example of a data processing program automatic generating system according to the present invention will be described in detail by using FIG. 1 and FIGS. 19 to 40A and 40B. This embodiment is an embodiment in the second form of the embodiment of the present invention. In this embodiment, the operation of a concrete system for automatically generating a program described in the programming language PL/SQL shown in FIGS. 40A and 40B, from the specifications shown in FIG. 19, will be described.

FIG. 19 is an example of the input specifications toward the data processing program automatic generating system. The data processing program automatic generating system of the present invention is to automatically generate a program to execute the processing specified by specifications.

In the example of FIG. 19, it is specified that a program to be generated has the program name of "SALES CALCULATION" in 1901. In 1903 to 1910, the name of a table of a database used in this processing, discrimination whether an input or an output, the item name of each table, the type of each item, and further calculation processing for obtaining the value of each item as for an output table, are specified. In this processing, two tables of SALES VOLUME and GOODS are specified as the input, and one table of SALES LIST is specified as the output. The table SALES VOLUME includes the items, CODE and SALES, which have the types, char(4) and number(6), respectively. The char(4) designates the character string of four digits, and the number(6) designates the numeral of six digits. Similarly, the table GOODS includes the items; CODE, NAME, and PRICE, which respectively have the types; char(4), char (20), and number(8). The table URIAGEDAKA includes the items; CODE, NAME, and TOTAL, and the calculation processing column "SALES VOLUME.CODE" and "GOODS.NAME" respectively mean that the value of the item CODE of the table SALES VOLUME is assigned as the value of the item CODE and that the value of the item NAME of the table GOODS is assigned as the value of the item NAME. The calculation processing "SALES VOLUME.SALES * GOODS.PRICE" means that the value obtained by multiplying the value of the item SALES of the table SALES VOLUME by the value of the item PRICE of the table GOODS is assigned as the value of the item TOTAL of the table SALES LIST. In 1911, the select condition, that is the condition in obtaining the data of the table SALES VOLUME and the table GOODS from the database, is specified. Here, the select condition shows that the data is input from the table SALES VOLUME and the table GOODS and then processed only when the value of the item SALES of the table SALES VOLUME is more than 10 and when the value of the item CODE of the table SALES VOLUME is equal to the value of the item CODE of the table GOODS. In 1912 and 1913, it is specified that the functions of "Init_module;", "End_module;" are called respectively as the initial processing and the end processing.

In FIG. 19, 1901 corresponds to the program name 1102 of FIG. 11, Steps 1903 to 1907 correspond to the input table item definition 1103 of FIG. 11, the information on the table name, the item name, and the type in 1908 to 1910 corresponds to the output table item definition 1104 of FIG. 11, the information of calculation processing in 1908 to 1910 corresponds to the output table processing definition 1105 of FIG. 11, 1911 corresponds to the select condition definition 1106 of FIG. 11, and 1912 and 1913 correspond to the program customize information 1107 of FIG. 11.

The processing expressed by this specification is to check the sales volume table (SALES VOLUME) having the items of the goods code (CODE) and the sales volume (SALES) and the goods master table (GOODS) having the items of the goods code (CODE), the goods name (NAME), and the price (PRICE) by the same goods code, and to generate a sales list (SALES LIST) having the items of the goods code (CODE), the goods name (NAME), and the total sales (TOTAL), as for the goods having the sales volume more than 10. At this time, this processing means that the value of the goods code item of the sales volume table is assigned to the value of the goods code item of the sales list, the value of the goods name of the goods master table having the corresponding goods code is assigned to the value of the goods name of the sales list, and that the product of the value of the sales volume item of the sales volume table and the value of the price item of the goods master table is assigned to the value of the total sales item of the sales list. FIG. 20 shows the schematic view of the specifications shown in FIG. 19. Here, since the same CODE item as that of the sales volume table 2001, for example, the same value as 0005 of the second record, exists in the fifth record of the goods master 2002, these records correspond with each other. Here, from the goods master table 2002, it is found that the name of the goods of the goods code 0005 is cookie and that its price is 400 yen. Thus, a record having the goods code of 0005, the goods name of cookie, and the total sales of 8,000 yen (20 pieces*400 yen) is generated in the sales list 2003 that is the output table.

The detailed operation of the specifications input means 101 of FIG. 1 in this embodiment will be described by using FIG. 21. FIG. 21 shows the operational procedure of the specifications input means 101.

With reference to FIG. 21, in 2101:, the internal variable <<internal information>> is made empty, and in 2102: and 2103:, the respective character strings, "program name: <<program name>>" and "table: [" are generated and added to <<internal information>>. Here, the double quotation shows the character string, and the item surrounded by << >> within the character string, namely <<program name>>, means that the value of an actual program name enters this portion within the character string. In 2104:, the processing from 2105: to 2112: is repeated as for each table within the specifications. The tables processed in each repetition are represented by <<table>>.

In 2105:, the character string "(<<table>>, <<input/output discrimination>>,[" is generated and added to <<internal information>>. Here, <<input/output discrimination>> means "input" or "output", and indicates the value obtained from the item of the input/output discrimination in the table of the specifications. In 2106:, whether <<input/output discrimination>> is "input" or "output" is checked; when it is "input", 2107: and 2108: are executed, and when it is "output", 2109: and 2110: are executed. The step 2107: indicates that 2108: will be repeated as for each item of <<table>>. The value of each item is regarded as <<item>>. In 2108:, the character string "(<<item>>, <<type>>)" is generated and added to <<internal information>>. The step 2109: indicates that 2110: will be repeated as for each item of <<table>>. The value of each item is regarded as <<item>>. In 2110:, the character string "(<<item>>, <<type>>, <<calculation processing>>)" is generated and added to <<internal information>>. The step 2111: shows the end of the IF statement starting from 2106:. In 2112:, the symbol "," added finally in the repetition processing of 2108: or 2110: is deleted and the character string "])" is added.

In 2113:, the character string "processing condition <<processing condition>>" is generated and added to <<internal information>>. The <<processing condition>> designates the character string specified in the portion of the select condition of the specifications. The step 2114: indicates that 2115: will be repeated as for the other attributes specified in the specifications. In 2115:, the character string "<<attribute name>>: <<attribute value>>" is generated and added to <<internal information>>. The <<attribute name>> and <<attribute value>> respectively designate the name and the value of an attribute within the specifications. In the example of the specifications of FIG. 2, the “initial processing” and the “end processing” are attribute names and “Init_module;” and “End_module;” are attribute values.

In the above operations, the information within the specifications have been fully taken in <<internal information>>. FIG. 22 shows an example of taking the specifications example shown in FIG. 19, in <<internal information>>. The specification input means 101 passes this <<internal information>> to the program skeleton customize information obtaining means 102, the cursor definition information obtaining means 103, and the output item processing information obtaining means 104 of FIG. 1.

The program skeleton customize information obtaining means 102 takes out the program name and the program customize information, from <<internal information>> received from the specifications input means 101 as shown in FIG. 22, in the form as shown in FIG. 23, and passes the same to the automatic program combining means 109. In FIG. 23, * means that “(<<attribute name>>.<<attribute value>>)” will be repeated for the number of the attribute names. The value is surrounded by the double quotation and dealt with as the character string. Upon receipt of <<internal information>> as shown in FIG. 22, the program skeleton customize information obtaining means 102 takes out the attribute name and attribute value respectively from 2201:, 2213:, and 2214:, generates <<program skeleton customize information>> in the form of FIG. 23, and passes the same to the automatic program combining means 109. FIG. 24 shows an example of <<program skeleton customize information>> obtained from the example of FIG. 22 according to this method.

The cursor definition information obtaining means 103 takes out the information of all the table names and item names in which the input is selected in the input/output discrimination, and the content of the calculation processing of all the table items in which the output is selected in the input/output discrimination, from <<internal information>> handed from the specifications input means 101, generates <<cursor definition information>> in the form of FIG. 25, and passes the same to the cursor definition statement generating means 105. In FIG. 25, * indicates that the element right before will be repeated for the necessary number. FIG. 26 shows an example of <<cursor definition information>> obtained from <<internal information>> of FIG. 22 in accordance with the form of FIG. 25. Upon receipt of <<internal information>> of FIG. 22, the cursor definition information obtaining means 103 of FIG. 1 changes the information from 2202: to 2206: into the form of 2501: of FIG. 25, and generates 2601: and 2602: of FIG. 26, within <<cursor definition information>>. This time, it extracts the information from 2211: to 2212 of FIG. 22 as it is and adds the same to <<cursor definition information>>. At last, extracting only the portion relative to the calculation processing from the information from 2207: to 2210: of FIG. 22, it changes the same into the form of 2503: of FIG. 15 and generates 2604:, 2605:, and 2606: of FIG. 26, within <<cursor definition information>>.

The output item processing information obtaining means 104 of FIG. 1 takes out the information of all the table names, item names, types, and calculation processing in which the output is selected in the input/output discrimination, from <<internal information>> handed from the specifications input means 101, generates the <<output item processing information>> in the form of FIG. 27, and passes the same to the work variable definition statement generating means 105 and the output processing statement generating means 107. In FIG. 27, * means that the element right before will be repeated for the necessary number. The values of the type and the calculation processing are surrounded by the double quotation and dealt with as the character string.

FIG. 28 shows an example of <<output item processing information>> obtained from <<internal information>> of FIG. 22 in accordance with the form of FIG. 27. The output item processing information obtaining means 104, upon receipt of <<internal information>> of FIG. 22, changes the information of 2207: to 2210: of FIG. 22 into the form of 2701: of FIG. 27, and generates 2801: to 2807: of FIG. 28, within <<output item processing information>>.

This time, the operation of the cursor definition statement generating means 105 will be described by using FIG. 29 and FIG. 30. FIG. 30 shows a skeleton representing the fixed framework, of the cursor definition statement to be generated, regardless of the content of specifications. The steps 3001: and 3008: are comment statements because they begin with “--” The steps 3002: to 3007: are the skeletons of the select statements for the database operation, and they become the completed select statements by processing the information obtained from the specifications and inserting the same information into <<Select item inserting position>>, <<input table name inserting position>>, and <<condition clause inserting position>>. The variable for cursor W_0 corresponding to the select statement defined in 3002 to 3007, is defined in 3009:. It is the cursor definition statement generating means 105 that inserts a piece of the program generated based on the information of FIG. 26 received from the cursor definition information obtaining means 103, into 3004: <<Select item inserting position>>, 3005: <<input table name inserting position>>, and 3006: <<condition clause inserting position>>, completes the cursor definition statement as <<cursor definition statement>>, and that passes the same to <<automatic program combining means>> 109.

FIG. 30 is a view corresponding to the cursor definition skeleton of FIG. 7 described in the form of the embodiment, for use in describing it in detail as a specified example. The <<select item string inserting position>> of 3004, <<input table string inserting position>> of 3005, and <<select condition inserting position>> of 3006 in FIG. 30 respectively correspond to the select item string inserting position 702, the input table string inserting position 703, and the select condition inserting position 704 of FIG. 7.

This time, the detailed operation of the cursor definition statement generating means 105 of FIG. 1 will be described by using FIG. 29. In 2900:, the cursor definition information is received from the cursor definition information obtaining means 103 of FIG. 1. In the example of the specifications of FIG. 19, FIG. 26 shows the cursor definition information. In 2901: and 2902:, the variable <<input table name string>> <<Select item string>> for use in the repetition processing is made empty, then to initialize. In 2903:, the processing from 2904: to 2912: will be repeated as for all the input table within the cursor definition information. In the repetition, the input table being noted is represented by <<input table>>. In 2904:, the processing from 2905: to 2912: will be repeated as for all the items of <<input table>> within the cursor definition information. In this repetition, the item being noted is represented by <<item>>. Namely, the processing from 2905: to 2912: will be repeated as for each <<item>> of each <<input table>>.

In 2905:, it is checked whether a combination of <<input table>> and <<item>> is used in the calculation processing within the cursor definition information. When it is used, a string "<<input table>>.<<item>> <<input table>>_<<item>>," is generated and added to the variable <<Select item string>> in 2906:. Here, the <<input table>> and <<item>> respectively designate the value of the input table and the value of the item being noted. In 2907:, whether <<input table>> exists in <<input table name string>> is checked. When it exists there, nothing is done (2908:); when it doesn't exist, a character string consisting of the variable <<input table>> and comma is added to the end of the variable <<input table name string>> in 2909:.

In 2913: and 2914:, each comma "," at the end of each variable, <<Select item string>> and <<input table name string>>, is deleted. This is why the comma is necessary for dividing each element and it is not necessary at the end. In 2915:, the content specified as the select condition within the specifications are set as the variable <<condition clause>>. In 2916: to 2918:, the values of the variables, <<Select item string>>, <<input table name string>>, and <<condition clause>> are respectively inserted in <<select item string inserting position>> of 3004:, <<input table string inserting position>> of 3005:, and <<select condition inserting position>> of 3006: of the cursor definition skeleton shown in FIG. 30, thereby completing a cursor definition statement. The completed cursor definition statement is handed to the automatic program combining means 109 of FIG. 1.

FIG. 29 is a view corresponding to the flow chart of the processing of the cursor definition statement generating means of FIG. 12 described in the second form of the embodiment, for use in describing it in detail as a specified example. In FIG. 29, 2900 corresponds to 1201 of FIG. 12, and Steps 2901 to 2914 correspond to 1201 to 1204 of FIG. 12. FIG. 29 is a view relating to a specified example in which the select item information generating processing of Step 1202 of FIG. 12 is executed as shown in FIG. 13 and simultaneously 1203 and 1204 are executed, because the processing is optimized. Step 2906 of FIG. 29 corresponds to 1203 of FIG. 12, and 2909 of FIG. 29 corresponds to 1204 of FIG. 12. Step 2915 of FIG. 29 corresponds to 1205 of FIG. 12, Steps 2916 to 2918 of FIG. 29 correspond to 1206 of FIG. 12, and 2919 of FIG. 29 corresponds to 1207 of FIG. 12.

FIG. 31 shows the cursor definition statement completed by filling the cursor definition statement skeleton of FIG. 30 with <<cursor definition information>> of FIG. 26, according to the method of FIG. 29. By comparing FIG. 31 with FIG. 30, it is found that the following strings are respectively inserted in <<select item string inserting position>>, <<input table string inserting position>>, and <<select condition inserting position>> of FIG. 30, so as to complete the cursor definition.

<<select item string inserting position>>:
SALES VOLUME.CODE SALES VOLUME_CODE,
SALES VOLUME.SALES SALES VOLUME_SALES,
GOODS.NAME GOODS_NAME,
GOODS.PRICE GOODS_PRICE <<input table string inserting position>>:
SALES VOLUME, GOODS <<select condition inserting position>>:
SALES VOLUME.SALES>10 and
SALES VOLUME.CODE=GOODS.CODE This time, the operation of the work variable definition statement generating means 106 will be described by using FIG. 32 and FIG. 33. FIG. 33 shows a skeleton representing the fixed framework, of the work variable definition statement to be generated, regardless of the content of specifications. Step 3301: is a comment statement because it starts with "--". Steps 3302: to 3305: are the skeleton for the type definition statement of a work variable. The name of the type of a work variable is inserted in 3302: and the output item definition information is inserted in 3304:, thereby completing a type definition statement of a work variable. Step 3306: is about the inserting position of the work variable definition statement for output. It is the work variable definition statement generating means 106 that a piece of the program generated based on <<output item processing information>> received from the output item processing information obtaining means 104 of FIG. 1 is inserted into

3302: <<work variable type name inserting position>>,
3304: <<output item definition inserting position>>, and
3306: <<variable definition statement inserting position>>, thereby completing a work variable definition statement and handing it to the automatic program combining means 109.

FIG. 33 is a view corresponding to the work variable definition skeleton of FIG. 8 described in the form of the embodiment, for use in describing it in detail as a specified example. Steps 3302 to 3305 of FIG. 33 correspond to the type definition statement inserting position 802 of FIG. 8. In FIG. 33, the skeleton is formed by including detailed <<work variable type name inserting position>> and <<output item definition inserting position>>, because it has a fixed portion independent of the specifications, peculiar to the PL/SQL language, in the type definition statement inserting position 802 of FIG. 8. Step 3306 <<variable definition statement inserting position>> of FIG. 33 corresponds to the variable definition statement inserting position 803 of FIG. 8.

The detailed operation of the work variable definition statement generating means 106 of FIG. 1, according to the present embodiment, will be described by using FIG. 32. In 3200:, <<output item processing information>> of FIG. 28 is received from the output item processing information obtaining means 104 of FIG. 1. In 3201: and 3202:, the variable <<work variable definition statement string>> used in the repetition processing is made empty and <<output table number>> is defined as 1, thereby initializing. Step 3202: indicates that 3204: to 3215: will be repeated for the number of times as shown in the output table within <<output item processing information>>, obtained from the output item processing information obtaining means 104 of FIG. 1. In 3204: to 3215:, the output table being noted is represented by <<output table>>.

In 3204:, a character string "<<output table>>_<<output table number>>_Type" is established in the variable <<work variable type name>>. Here, <<output table>> and <<output table number>> are respectively replaced by the values of the variables, <<output table>> and <<output table number>>. In 3205:, the variable, <<output item definition>> used in the repetition processing is made empty, thereby initializing.

Step 3206: indicates that 3207: to 3208: will be repeated for the number of times corresponding to the number of items as for each <<output table>> within <<output item processing information>>. In 3207: and 3208:, the item being noted is represented by <<item>>. In 3207:, the type corresponding to <<item>> of <<output table>> within the specifications are established in <<type>>, and in 3208:, the character string ",<<item>> <<type>>" is generated and added to the variable <<output item definition>>. At this time, <<item>> and <<type>> are respectively replaced by the values of the variables <<item>> and <<type>>. In 3209: and 3210:, "<<output table>>_<<output table number>> <<work variable type name>>;" is set in the variable <<variable definition>>. Since <<work variable type name>> has been set in "<<output table>>_<<output table number>>Type;" in 3204:, "<<output table>>_<<output table number>> <<output table>>_<<output table number>>Type;" is set in the variable <<variable definition>> in the end.

In 3211: to 3213:, respectively,

<<work variable type name>> is inserted in <<work variable type name inserting position>>,
<<output item definition>> is inserted in <<output item definition inserting position>>, and
<<variable definition>> is inserted in <<variable definition statement inserting position>>, in the work variable skeleton, thereby completing a work variable definition statement.

In 3214:, the completed work variable definition statement is added to <<work variable definition statement string>>, and in 3215:, 1 is added to the output table number. Steps 3214: and 3215: are steps for preparing for the next repetition when there are a plurality of output tables. After adding the work variable definition statement relative to all the output tables to <<work variable definition statement string>>, the work variable definition statement generating means 106 of FIG. 1 hands <<work variable definition statement string>> to the automatic program combining means 109.

FIG. 34 shows the work variable definition statement completed by filling the work variable skeleton of FIG. 33 with <<output item processing information>> of FIG. 28, according to the method of FIG. 32. By comparing FIG. 34 with FIG. 33, it is found that the following character strings are respectively inserted in <<work variable type name inserting position>>, <<output item definition inserting position>>, and <<variable definition statement inserting position>> of FIG. 33, thereby completing the work variable definition.

<<work variable type name inserting position>>: SALES LIST_1_Type

<<output item definition inserting position>>:
, CODE char(4)
, NAME char(13)
, TOTAL number(14)

<<variable definition inserting position>>: SALES LIST_1 URIAGEDATA_1_Type In the example of FIG. 28, since there is only one output table, only one work variable definition statement for output is generated; when there are a plurality of output tables, however, a type definition statement and a variable definition statement are generated for the number of the output tables.

FIG. 32 is a view corresponding to the flow chart of the processing of the work variable definition statement generating means of FIG. 4 described in the form of the embodiment, for use in describing it in detail as a specified example. In FIG. 32, 3200 corresponds to 401 of FIG. 4, and Steps 3203 to 3215 correspond to the repetition of 402 of FIG. 4. Step 3204 of FIG. 32 is the preparatory step to both 403 and 404 of FIG. 4. Steps 3205 to 3208 of FIG. 32 correspond to 403 of FIG. 4, which is the portion for generating a type definition statement. Steps 3209 and 3210 of FIG. 32 correspond to 404 of FIG. 4, which is the portion for generating a variable definition statement. Steps 3211 to 3213 of FIG. 32 correspond to 405 of FIG. 4, where <<work variable type name>> and <<output item definition>> that is the portion of a type definition statement, and a variable definition statement are generated. Step 3216 of FIG. 32 corresponds to 406 of FIG. 4.

This time, the operation of the output processing statement generating means 107 will be described by using FIG. 35 and FIG. 36. FIG. 36 shows a skeleton representing the fixed framework, independent of the specifications, of an output statement to be generated. Steps 3601:, 3603:, and 3611: are comment statements because they start with "--". Step 3602: means that a statement string for calculating the value of each item of an output table is inserted there. In 3604:, 0 is assigned to the variable SQLRESULT. Since the variable SQLRESULT has the value 0 during the normal operation, this setting of 0 means initialization of the variable. In 3605: to 3610:, the processing for writing into a database table the value of each item of an output table calculated by the statement inserted in 3602:, is performed by the insert-statement. The value of the item specified in <<output item name inserting position>> of 3607:, of the table specified in <<output table name inserting position>> of 3606:, is regarded as the value of the variable specified in <<work variable name inserting position>> of 3609:, which is written in a database. When an error occurs in the writing processing into the database, Steps 3612: to 3615: are the fixed processing in which the value of the SQLCODE that is an error code handed from the database is assigned to the variable SQLRESULT.

The output processing statement generating means 107 inserts a piece of the program generated based on <<output item processing information>> received from the output item processing information obtaining means 104, into

3602: <<item calculation statement inserting position>>,
3606: <<output table name inserting position>>,
3607: <<output item name inserting position>>, and
3609: <<work variable name inserting position>>, of this skeleton.

And then, it completes an output processing statement as <<output processing statement>>, and hands the same to the automatic program combining means 109.

FIG. 36 is a view corresponding to the output processing statement skeleton of FIG. 9 described in the form of the embodiment, for use in describing it in detail as a specified example. Step 3602 <<item calculation statement inserting position>> of FIG. 36 corresponds to the item calculation statement inserting position 902 of FIG. 9A. Steps 3606 to 3610 of FIG. 36 correspond to the output statement inserting portion 903. In FIG. 36, the skeleton is formed by including detailed <<output table name inserting position>>, <<output item name inserting position>>, and <<work variable name inserting position>>, because it has the fixed portion independent of the specifications, peculiar to the PL/SQL language, in the output statement inserting position 903 of FIG. 9A.

This time, the detailed operation of the output processing statement generating means 107 will be described by using FIG. 35. In 3500:, the output item processing information is input from the output item processing information obtaining means 104 of FIG. 1. In this example, the output item processing information becomes the form of FIG. 28. In 3501: and 3502:, the variable <<output processing statement string>> used in the repetition processing is made empty and <<output table number>> is defined as 1, thereby initializing. Step 3503: means that 3504: to 3521 will be repeated for the number of times corresponding to the number of output tables, within the output item processing information obtained from the output item processing information obtaining means 104 of FIG. 1. In 3504: to 3521:, the output table being noted is represented by <<output table>>.

In 3504: to 3506:, the variables, <<calculation statement string>>, <<item name string>>, and <<variable name string>> used in the repetition processing are respectively made empty, thereby initializing. Step 3507: means that 3508: to 3513: will be repeated for the number of times corresponding to the number of items of <<output table>>, within the output item processing information obtained from the output item processing information obtaining means 104 of FIG. 1. In 3508: to 3513:, the item being noted is represented by <<item>>. In 3508: and 3509:, the symbol "." appearing in the value of the calculation processing column corresponding to <<item>> of <<output table>> within the output item processing information is replaced by "_", and "W_0." is added to the name of the table at the top, which is set in the variable <<calculation expression>>. In 3510: and 3511:, a character string "<<output table>>_<<output table number>>.<<item>>:=<<calculation expression>>;" is generated, and it is added to the end of the variable <<calculation statement string>>. In the above character string, <<output table>>, <<output table number>>, <<item>>, and <<calculation expression>> are respectively replaced by the values of the variables <<output table>>, <<output table number>>, <<item>>, and <<calculation expression>>. In 3512:, the character string "<<item>>" is added to the end of the variable <<item name string>>. In 3513:, the character string "<<output table>>_<<output table number>>.<<item>>," is added to the end of the variable <<variable name string>>. Within the above character strings, <<output table>>, <<output table number>>, and <<item>> are respectively replaced by the respective values of the variables.

In 3514: and 3515:, the respective symbols "," at the end of <<item name string>> and <<variable name string>> are deleted. This is why a comma is necessary for dividing each element and it is not necessary at the end. In 3516: to 3519:, the values of the variables, <<calculation statement string>>, <<output table>>, <<item name string>>, and <<variable name string>> are respectively inserted into <<output item calculation statement inserting position>>, <<output table name inserting position>>, <<output item name inserting position>>, and <<work variable name inserting position>> of the output processing statement skeleton, thereby completing an output processing statement. In 3520:, the completed output processing statement is added to the end of <<output processing statement string>>, and in 3521:, 1 is added to the output table number. Steps 3520: and 3521: are preparatory steps for the next repetition when there are a plurality of output tables. After adding the output processing statement relative to all the output tables to <<output processing statement string>>, the work variable definition statement generating means 107 of FIG. 1 hands <<output processing statement string>> to the automatic program combining means 109.

FIG. 37 shows the output processing statement completed by filling the output processing statement skeleton of FIG. 36 with <<output item processing information>> of FIG. 28, in accordance with the method of FIG. 35. By comparing FIG. 36 with FIG. 37, it is found that the respective following character strings are inserted into <<item calculation statement string inserting position>>, <<output table name inserting position>>, <<output item name inserting position>>, and <<work variable name inserting position>> of FIG. 36, thereby completing the output processing.

<<item calculation statement inserting position>>:
SALES LIST_1.CODE:=W_0.SALES VOLUME_CODE;
SALES LIST_1.NAME:=W_0.GOODS_NAME;
SALES LIST_1.TOTAL:=W_0.SALES VOLUME_SALES*W_0.GOODS_PRICE;

<<output table name inserting position>>:
SALES LIST

<<output item name inserting position>>:
CODE,
NAME,
TOTAL

<<work variable name inserting position>>:
SALES LIST_1.CODE,
SALES LIST_1.NAME,
SALES LIST_1.TOTAL FIG. 35 is a view corresponding to the flow chart of the processing of the output processing statement generating means of FIG. 5 described in the form of the embodiment, for use in describing it in detail as a specified example. In FIG. 35, 3500 corresponds to 501 of FIG. 5, and Steps 3503 to 3521 correspond to the repetition of 502 of FIG. 5. In FIG. 35, since the processing in the specified example is optimized, 503 and 504 in FIG. 5 are mixed. Steps 3504, and 3508 to 3511 of FIG. 35 correspond to the generation of the item calculation statement in 503 of FIG. 5. Steps 3505 and 3506, 3512 and 3513, and 3514 and 3515 of FIG. 35 correspond to the generation of the output statement in 504 of FIG. 5. Steps 3516 to 3519 of FIG. 35 correspond to 505 of FIG. 5. Step 3522 of FIG. 35 corresponds to 506 of FIG. 5.

This time, the automatic program combining means 109 and the program skeleton 108 of FIG. 1, in this embodiment, will be described. FIG. 39 shows a program skeleton in this embodiment. This is the skeleton of the fixed portion regardless of the content of the specifications, of the data processing program output by the data processing program automatic generating system of the present invention. In FIG. 39, there are some portions where a specific program is not formed at six positions; <<program name inserting position>>, <<cursor definition statement inserting position>>, <<work variable definition statement string inserting position>>, <<"initial processing" inserting position>>, <<output processing statement string inserting position>>, and <<"end processing" inserting position>>. These portions are the changeable parts of a program with a change in the specifications. The automatic program combining means 109 of FIG. 1 inserts <<program skeleton customize information>>, <<cursor definition statement>>, <<work variable definition statement string>>, and <<output processing statement string>> respectively handed from the program skeleton customize information obtaining means 102, the cursor definition statement generating means 105, the work variable definition statement generating means 106, and the output processing statement generating means 107, into these six positions, thereby completing a data processing program and outputting a generation program 2.

FIG. 39 is a view corresponding to the program skeleton of FIG. 10 described in the form of the embodiment, for use in describing it in detail as a specified example. Steps 3901:<<program name inserting position>>, 3909:<<cursor definition statement inserting position>>, 3910:<<work variable definition statement string inserting position>>, 3914:<<"initial processing" inserting position>>, 3927:<<output processing statement inserting position>>, 3930:<<"end processing" inserting position>> of FIG. 39 respectively correspond to the program name inserting position 1002, the cursor definition statement inserting position 1003, the work variable definition statement string inserting position 1004, the "initial processing" inserting position 1005, the output processing statement inserting position 1006, and the "end processing" inserting position 1007 of FIG. 10.

FIG. 38 shows the processing procedure of the automatic program combining means 109 of FIG. 1 in this embodiment. At first, the program skeleton 108 of FIG. 1 is input in 3800:. In 3801:, <<program name>>, <<program customize information>>, <<cursor definition statement>>, <<work variable definition statement string>>, and <<output processing statement string>> are received. In 3802: to 3804:, character strings corresponding to the program name, initial processing, and end processing, from <<program skeleton customize information>> handed from the program skeleton customize information obtaining means 102: of FIG. 1, are respectively inserted into 3901:<<program name inserting position>>, 3914:<<initial processing inserting position>>, and 3930:<<end processing inserting position>> of FIG. 39. In 3805:, <<cursor definition statement>> handed from the cursor definition statement generating means 105 of FIG. 1 is inserted into 3909:<<cursor definition statement inserting position>> of FIG. 39. In 3806:, <<work variable definition statement string>> handed from the work variable definition statement generating means 106 of FIG. 1 is inserted into 3910:<<work variable definition statement string inserting position>> of FIG. 39. In 3807:, <<output processing character string>> handed from the output processing statement generating means 106 of FIG. 1 is inserted into 3927:<<output processing statement string inserting position>> of FIG. 39. In 3808:, the data processing program thus completed is output as the generation program 2 in FIG. 1. In the above operations, the program automatic generation from the specifications are completely finished.

FIGS. 40A and 40*b* show an example of the generation program output from the specifications as shown in FIG. 19. By comparing FIG. 39 with FIGS. 40A and 40B, it is found that the following statements are respectively inserted into <<program name inserting position>>, <<cursor definition statement inserting position>>, <<work variable definition statement inserting position>>, <<initial processing statement inserting position>>, <<output processing statement inserting position>>, and <<end processing statement inserting position>>, thereby completing the program.

```
<<program name inserting position>>:
SALES_CALCULATION( )

<<cursor definition statement inserting position>>:
--cursor definition
cursor CSR_0 is
select
SALES.CODE SALES VOLUME_CODE,
SALES VOLUME.SALES SALES VOLUME_SALES,
GOODS.NAME GOODS_NAME,
GOODS.PRICE GOODS_PRICE
from SALES VOLUME, GOODS
where SALES VOLUME.SALES>10
and SALES VOLUME.CODE=GOODS.CODE
--variable definition for cursor
W_0 CSR_0%rowtype;

<<work variable definition statement inserting position>>:
--work variable definition for output
type SALES LIST_1_Type is record(
W_ROWID rowid
,CODE char(4)
,NAME char(22)
,TOTAL number(14)
);
SALES LIST_1 SALES LIST_1_Type;

<<initial processing statement inserting position>>: Init_
  module;

<<output processing statement inserting position>>:
--calculation of each output item
SALES LIST_1.CODE:=W_0.SALES VOLUME_
  CODE;
SALES LIST_1.NAME:=W_0.GOODS_NAME;
SALES LIST_1.TOTAL:=W_0.SALES VOLUME_
  SALES*W_0.GOODS_PRICE
--output processing to output table
SQLRESULT:=0;
begin
insert into SALES LIST(
CODE
,NAME
,TOTAL_SALE
)values(
SALES LIST_1.CODE
,SALES LIST_1.NAME
SALES LIST_1.TOTAL
);
/* exception processing */
--exception processing
exception
when others then
SQLRESULT :=SQLCODE;
end;

<<end processing statement inserting position>>:
End_module;
```

FIG. 38 is a view corresponding to the flow chart of the processing of the automatic program combining means of FIG. 6 described in the form of the embodiment. In FIG. 38, Steps 3800 and 3801 respectively correspond to 601 and 602 of FIG. 6. Steps 3802 to 3804 of FIG. 38 correspond to 606 of FIG. 6, and Steps 3805, 3806, and 3807 of FIG. 38 respectively correspond to 603, 604, and 605 of FIG. 6. Step 3803 of FIG. 38 corresponds to 607 of FIG. 6.

What is claimed is:

1. A program generation system for generating a data processing program which searches, updates, and deletes data, which comprises:

specifications input means for inputting specifications including program name, input table item definition, select item definition, output table item definition, output table processing definition, select condition definition, and program customize information;

a program skeleton customize information obtaining means for taking out said program name and said program customize information from said specifications outputted from said specifications input means;

a cursor definition information obtaining means for taking out said input table item definition, said select item definition, and said select condition definition from said specifications outputted from said specifications input means;

an output item processing information obtaining means for taking out said output table item definition and said output table processing definition from said specifications outputted from said specifications input means;

a cursor definition statement generating means for generating a cursor definition statement on the basis of the output from said cursor definition information obtaining means;

a work variable definition statement generating means for generating a work variable definition statement concerning output tables belonging to the processing type "insert" among said output table item definition obtained by said output item processing information obtaining means;

an output processing statement generating means for generating on the basis of said output table item definition and said output table processing definition;

an output processing statement including a processing condition statement, an item calculation statement, and an insert statement in the case of the processing type "insert", an output processing statement including a processing condition statement and an update statement in the case of the processing type "update", and an output processing statement including a processing condition statement and a delete statement in the case of the processing type "delete"; and a program combining means for completing and outputting said data processing program by inserting said program name, said program customize information, said cursor definition statement, said work variable definition statement, and said output processing statement, into a program skeleton which includes a fixed program portion regardless of the content of said specifications and a changeable program portion depending upon said specifications.

2. The program generation system as claimed in claim 1, comprising:

a program skeleton library for storing a plurality of kinds of program skeletons including a program of a fixed portion regardless of the content of specifications and an inserting position of a piece of the program corresponding to a portion changeable according to specifications; and a program skeleton selecting means for selecting one program skeleton a user specifies, from said program skeleton library, and passing the program to said automatic program combining means.

3. The program generation system as claimed in claim 1, wherein said specifications input means inputs all input table names and output table names for use in processing, and type information and all item names of the corresponding input table and output table are retrieved and obtained from the table definition information of a database, and represented to specifications describer on a screen, which enables the describer to specify any specifications information other than the input table definition and the output table item definition.

4. The program generation system as claimed in claim 1, wherein:

said program skeleton includes a debugging trace statement; and said program combining means removes the debugging trace statement within the program skeleton, or leaves the same, according to generation program discriminating information indicating whether a debugging program is generated, or a real program is generated.

5. A program generation system for generating a data processing program which searches, updates, and deletes data, which comprises:

specifications input means for inputting specifications including program name, input table item definition, output table item definition, output table processing definition, select condition definition, and program customize information;

a program skeleton customize information obtaining means for taking out said program name and said program customize information from said specifications outputted from said specifications input means;

a cursor definition information obtaining means for taking out said input table item definition, said select condition definition, and said output table processing definition from said specifications outputted from said specifications input means; an output item processing information obtaining means for taking out said output table item definition and said output table processing definition from said specifications outputted from said specifications input means;

a cursor definition statement generating means for generating a select item definition on the basis of said input table item definition, said select condition definition, and said output table processing definition obtained by said cursor definition information obtaining means, and for generating a cursor definition statement on the basis of said generated select item definition and said select condition definition obtained by said cursor definition information obtaining means;

a work variable definition statement generating means for generating a work variable definition statement concerning output tables belonging to the processing type "insert" among said output table item definition;

an output processing statement generating means for generating on the basis of said output table item definition and said output table processing definition, an output processing statement including a processing condition statement, an item calculation statement, and an insert statement in the case of the processing type "insert", an output processing statement including a processing condition statement and an update statement in the case of the processing type "update", and and generating an output processing statement including a processing condition statement and a delete statement in the case of the processing type "delete"; and a program combining means for completing and outputting said data processing program by inserting said program name, said program skeleton customize information, said cursor definition statement, said work variable definition statement, and said output processing statement, into a program skeleton which includes a fixed program portion regardless of the content of said specifications and a changeable program portion depending upon said specifications.

6. The program generation system as claimed in claim 5, comprising:

a program skeleton library for storing a plurality of kinds of program skeletons including a program of a fixed portion regardless of the content of specifications and an inserting position of a piece of the program corresponding to a portion changeable according to specifications; and a program skeleton selecting means for selecting one program skeleton a user specifies, from said program skeleton library, and passing the program to said automatic program combining means.

7. The program generation system as claimed in claim 5, wherein said specifications input means inputs all input table names and output table names for use in processing, and type information and all item names of the corresponding input table and output table are retrieved and obtained from the table definition information of a database, and represented to specifications describer on a screen, which enables the describer to specify any specifications information other than the input table definition and the output table item definition.

8. The program generation system as claimed in claim 5, wherein:

said program skeleton includes a debugging trace statement; and said program combining means removes the debugging trace statement within the program skeleton, or leaves the same, according to generation program discriminating information indicating whether a debugging program is generated, or a real program is generated.

9. A program generation method for generating a data processing program which searches, updates, and deletes data, which comprises the steps of:

(a) inputting specifications including program name, input table item definition, select item definition, output table item definition, output table processing definition, select condition definition, and program customize information;

(b) taking out the program name and the program customize information, as the information for customizing a program skeleton, from the specifications input in said step (a);

(c) taking out the input table item definition, the select item definition, and the select condition definition, from the specifications input in said step (a);

(d) taking out the output table item definition and the output table processing definition, from the specifications input in said step (a);

(e) generating a cursor definition statement from the information obtained in said step (c);

(f) generating a work variable definition statement, from an output table belonging to the processing type "insert", of the output table item definition obtained in said step (d);

(g) generating an output processing statement including a processing condition statement, an item calculation statement, and an insert statement in the case of the processing type "insert", generating an output processing statement including a processing condition statement and an update statement in the case of the processing type "update", and generating an output processing statement including a processing condition statement and a delete statement in the case of the processing type "delete", from the output table item definition and the output table processing definition obtained in said step (d); and (h) completing and outputting a program by inserting the program name and the program customize information obtained in said step (b), the generated cursor definition statement, the generated work variable definition statement, and the generated output processing statement, into the respective corresponding inserting positions of a program skeleton, including the program of a fixed portion regardless of the content of specifications and an inserting position of a piece of the program corresponding to a portion changeable according to specifications.

10. A program generation method for generating a data processing program which searches, updates, and deletes data, which comprises the steps of:

(a) inputting specifications including program name, input table item definition, output table item definition, output table processing definition, select condition definition, and program customize information;

(b) taking out the program name and the program customize information, as the information for customizing a program skeleton, from the specifications input in said step (a);

(c) taking out the input table item definition, and the select condition definition, from the specifications input in said step (a);

(d) taking out the output table item definition and the output table processing definition, from the specifications input in said step (a);

(e) generating a select item definition from the input table item definition, the select condition definition and the output table processing definition obtained in said step (c), and generating a cursor definition statement from the information obtained in said step (c);

(f) generating a work variable definition statement, from an output table belonging to the processing type "insert", of the output table item definition obtained in said step (d);

(g) generating an output processing statement including a processing condition statement, an item calculation statement, and an insert statement in the case of the processing type "insert", generating an output processing statement including a processing condition statement and an update statement in the case of the processing type "update", and generating an output processing statement including a processing condition statement and a delete statement in the case of the processing type "delete", from the output table item definition and the output table processing definition obtained in said step (d); and (h) completing and outputting a program by inserting the program name and the program customize information obtained in said step (b), the generated cursor definition statement, the generated work variable definition statement, and the generated output processing statement, into the respective corresponding inserting positions of a program skeleton, including the program of a fixed portion regardless of the content of specifications and an inserting position of a piece of the program corresponding to a portion changeable according to specifications.

11. A computer program product stored in a computer readable medium for generating a data processing program for performing data processing comprising the steps of:

(a) inputting specifications including program name, input table item definition, select item definition, output table item definition, output table processing definition, select condition definition, and program customize information;

(b) taking out the program name and the program customize information, as the information for customizing a program skeleton, from the specifications input in said step (a);

(c) taking out the input table item definition, the select item definition, and the select condition definition, from the specifications input in said step (a);

(d) taking out the output table item definition and the output table processing definition, from the specifications input in said step (a);

(e) generating a cursor definition statement from the information obtained in said step (c);

(f) generating a work variable definition statement from an output table belonging to the processing type "insert", of the output table item definition obtained in said step (d);

(g) generating an output processing statement including a processing condition statement, an item calculation statement, and an insert statement in the case of the processing type "insert", generating an output processing statement including a processing condition statement and an update statement in the case of the processing type "update", and generating an output processing statement including a processing condition statement and a delete statement in the case of the processing type "delete", from the output table item definition and the output table processing definition obtained in said step (d); and (h) completing and outputting a program by inserting the program name and the program customize information obtained in said step (b), the generated cursor definition statement, the generated work variable definition statement, and the generated output processing statement, into the respective corresponding inserting positions of a program skeleton, including the program of a fixed portion regardless of the content of specifications and an inserting position of a piece of the program corresponding to a portion changeable according to specifications.

12. A computer program product stored in a computer readable medium for generating a data processing program for performing data processing comprising the steps of:

(a) inputting specifications including program name, input table item definition, output table item definition, output table processing definition, select condition definition, and program customize information;

(b) taking out the program name and the program customize information, as the information for customizing a program skeleton, from the specifications input in said step (a);

(c) taking out the input table item definition, and the select condition definition, from the specifications input in said step (a);

(d) taking out the output table item definition and the output table processing definition, from the specifications input in said step (a);

(e) generating a select item definition from the input table item definition, the select condition definition and the output table processing definition obtained in said step (c), and generating a cursor definition statement from the information obtained in said step (c);

(f) generating a work variable definition statement, from an output table belonging to the processing type "insert", of the output table item definition obtained in said step (d);

(g) generating an output processing statement including a processing condition statement, an item calculation statement, and an insert statement in the case of the processing type "insert", generating an output processing statement including a processing condition statement and an update statement in the case of the processing type "update", and generating an output processing statement including a processing condition statement and a delete statement in the case of the processing type "delete", from the output table item definition and the output table processing definition obtained in said step (d); and (h) completing and outputting a program by inserting the program name and the program customize information obtained in said step (b), the generated cursor definition statement, the generated work variable definition statement, and the generated output processing statement, into the respective corresponding inserting positions of a program skeleton, including the program of a fixed portion regardless of the content of specifications and an inserting position of a piece of the program corresponding to a portion changeable according to specifications.

* * * * *